US010871967B2

(12) United States Patent
Burger et al.

(10) Patent No.: US 10,871,967 B2
(45) Date of Patent: Dec. 22, 2020

(54) REGISTER READ/WRITE ORDERING

(71) Applicant: Microsoft Technology Licensing, LLC, Redmond, WA (US)

(72) Inventors: Douglas C. Burger, Bellevue, WA (US); Aaron L. Smith, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 97 days.

(21) Appl. No.: 15/012,662

(22) Filed: Feb. 1, 2016

(65) Prior Publication Data

US 2017/0083326 A1    Mar. 23, 2017

Related U.S. Application Data

(60) Provisional application No. 62/221,003, filed on Sep. 19, 2015.

(51) Int. Cl.
*G06F 9/30* (2018.01)
*G06F 9/38* (2018.01)
(Continued)

(52) U.S. Cl.
CPC ............ *G06F 9/3016* (2013.01); *G06F 9/268* (2013.01); *G06F 9/3004* (2013.01);
(Continued)

(58) Field of Classification Search
CPC .... G06F 9/3818; G06F 9/3838; G06F 9/3836; G06F 9/3016
See application file for complete search history.

(56) References Cited

U.S. PATENT DOCUMENTS 5,142,631 A    8/1992 Murray et al.
5,317,734 A    5/1994 Gupta
(Continued)

FOREIGN PATENT DOCUMENTS

EP    0583089    2/1994
EP    2527972    11/2012
(Continued)

OTHER PUBLICATIONS

Kostas Pagiamtzis and Ali Sheikholeslami, "Content-Addressable Memory (CAM) Circuits and Architectures: A Tutorial and Survey", 2006, IEEE. (Year: 2006).*

(Continued)

*Primary Examiner* — Benjamin P Geib
(74) *Attorney, Agent, or Firm* — Klarquist Sparkman, LLP

(57) ABSTRACT

Apparatus and methods are disclosed for controlling execution of register access instructions in a block-based processor architecture using a hardware structure that indicates a relative ordering of register access instruction in an instruction block. In one example of the disclosed technology, a method of operating a processor includes selecting a register access instruction of the plurality of instructions to execute based at least in part on dependencies encoded within a previous block of instructions and on stored data indicating which of the register write instructions have executed for the previous block, and executing the selected instruction. In some examples, one or more of a write mask, a read mask, a register write vector register, or a counter are used to determine register read/write dependences. Based on the encoded dependencies and the masked write vector, the next instruction block can issue when its register dependencies are available.

20 Claims, 15 Drawing Sheets

(51) Int. Cl.

| | | |
|---|---|---|
| *G06F 9/46* | (2006.01) | |
| *G06F 9/52* | (2006.01) | |
| *G06F 11/36* | (2006.01) | |
| *G06F 15/78* | (2006.01) | |
| *G06F 9/26* | (2006.01) | |
| *G06F 9/32* | (2018.01) | |
| *G06F 9/345* | (2018.01) | |
| *G06F 9/35* | (2018.01) | |
| *G06F 12/0806* | (2016.01) | |
| *G06F 12/0862* | (2016.01) | |
| *G06F 12/1009* | (2016.01) | |
| *G06F 13/42* | (2006.01) | |
| *G06F 15/80* | (2006.01) | |
| *G06F 9/355* | (2018.01) | |
| *G06F 12/0811* | (2016.01) | |
| *G06F 12/0875* | (2016.01) | |

(52) U.S. Cl.
CPC ........ *G06F 9/3005* (2013.01); *G06F 9/30007* (2013.01); *G06F 9/3009* (2013.01); *G06F 9/30021* (2013.01); *G06F 9/30036* (2013.01); *G06F 9/30043* (2013.01); *G06F 9/30047* (2013.01); *G06F 9/30058* (2013.01); *G06F 9/30072* (2013.01); *G06F 9/30076* (2013.01); *G06F 9/30087* (2013.01); *G06F 9/30098* (2013.01); *G06F 9/30101* (2013.01); *G06F 9/30105* (2013.01); *G06F 9/30138* (2013.01); *G06F 9/30145* (2013.01); *G06F 9/30167* (2013.01); *G06F 9/30189* (2013.01); *G06F 9/32* (2013.01); *G06F 9/345* (2013.01); *G06F 9/35* (2013.01); *G06F 9/3802* (2013.01); *G06F 9/383* (2013.01); *G06F 9/3804* (2013.01); *G06F 9/3822* (2013.01); *G06F 9/3824* (2013.01); *G06F 9/3828* (2013.01); *G06F 9/3836* (2013.01); *G06F 9/3838* (2013.01); *G06F 9/3842* (2013.01); *G06F 9/3848* (2013.01); *G06F 9/3851* (2013.01); *G06F 9/3853* (2013.01); *G06F 9/3855* (2013.01); *G06F 9/3859* (2013.01); *G06F 9/3867* (2013.01); *G06F 9/3891* (2013.01); *G06F 9/466* (2013.01); *G06F 9/528* (2013.01); *G06F 11/36* (2013.01); *G06F 11/3648* (2013.01); *G06F 11/3656* (2013.01); *G06F 12/0806* (2013.01); *G06F 12/0862* (2013.01); *G06F 12/1009* (2013.01); *G06F 13/4221* (2013.01); *G06F 15/7867* (2013.01); *G06F 15/80* (2013.01); *G06F 15/8007* (2013.01); *G06F 9/3013* (2013.01); *G06F 9/321* (2013.01); *G06F 9/355* (2013.01); *G06F 9/3557* (2013.01); *G06F 12/0811* (2013.01); *G06F 12/0875* (2013.01); *G06F 2212/452* (2013.01); *G06F 2212/602* (2013.01); *G06F 2212/604* (2013.01); *G06F 2212/62* (2013.01); *Y02D 10/00* (2018.01)

(56) References Cited

U.S. PATENT DOCUMENTS

| | | | |
|---|---|---|---|
| 5,333,283 A | 7/1994 | Emma et al. | |
| 5,615,350 A | 3/1997 | Hesson | |
| 5,669,001 A | 9/1997 | Moreno | |
| 5,729,228 A | 3/1998 | Franaszek et al. | |
| 5,751,985 A | 5/1998 | Shen et al. | |
| 5,790,822 A | 8/1998 | Sheaffer et al. | |
| 5,796,997 A | 8/1998 | Lesartre et al. | |
| 5,845,103 A | 12/1998 | Sodani et al. | |
| 5,903,750 A | 5/1999 | Yeh et al. | |
| 5,905,893 A | 5/1999 | Worrell | |
| 5,917,505 A | 6/1999 | Larson | |
| 5,943,501 A | 8/1999 | Burger et al. | |
| 6,016,399 A | 1/2000 | Chang | |
| 6,061,776 A | 5/2000 | Burger et al. | |
| 6,161,170 A | 12/2000 | Burger et al. | |
| 6,164,841 A | 12/2000 | Mattson et al. | |
| 6,167,491 A | 12/2000 | McAlpine | |
| 6,178,498 B1 | 1/2001 | Sharangpani et al. | |
| 6,212,621 B1* | 4/2001 | Mahalingaiah | G06F 9/30152 712/200 |
| 6,212,622 B1 | 4/2001 | Witt | |
| 6,240,510 B1 | 5/2001 | Yeh et al. | |
| 6,282,708 B1 | 8/2001 | Augusteijn et al. | |
| 6,314,493 B1 | 11/2001 | Luick | |
| 6,353,883 B1 | 3/2002 | Grochowski et al. | |
| 6,493,820 B2 | 12/2002 | Akkary et al. | |
| 6,529,922 B1 | 3/2003 | Hoge | |
| 6,662,294 B1 | 12/2003 | Kahle et al. | |
| 6,820,192 B2 | 11/2004 | Cho et al. | |
| 6,892,292 B2 | 5/2005 | Henkel et al. | |
| 6,918,032 B1 | 7/2005 | Abdallah et al. | |
| 6,965,969 B2 | 11/2005 | Burger et al. | |
| 6,988,183 B1 | 1/2006 | Wong | |
| 7,032,217 B2 | 4/2006 | Wu | |
| 7,085,919 B2 | 8/2006 | Grochowski et al. | |
| 7,095,343 B2 | 8/2006 | Xie et al. | |
| 7,299,458 B2 | 11/2007 | Hammes | |
| 7,302,543 B2 | 11/2007 | Lekatsas et al. | |
| 7,380,038 B2 | 5/2008 | Gray | |
| 7,487,340 B2 | 2/2009 | Luick | |
| 7,571,284 B1 | 8/2009 | Olson | |
| 7,624,386 B2 | 11/2009 | Robison | |
| 7,631,170 B2 | 12/2009 | Dowling | |
| 7,676,650 B2 | 3/2010 | Ukai | |
| 7,676,669 B2 | 3/2010 | Ohwada | |
| 7,836,289 B2 | 11/2010 | Tani | |
| 7,853,777 B2 | 12/2010 | Jones et al. | |
| 7,877,580 B2 | 1/2011 | Eickemeyer et al. | |
| 7,917,733 B2 | 3/2011 | Kazuma | |
| 7,970,965 B2 | 6/2011 | Kedem et al. | |
| 8,024,522 B1 | 9/2011 | Favor et al. | |
| 8,055,881 B2 | 11/2011 | Burger et al. | |
| 8,055,885 B2 | 11/2011 | Nakashima | |
| 8,127,119 B2 | 2/2012 | Burger et al. | |
| 8,180,997 B2 | 5/2012 | Burger et al. | |
| 8,201,024 B2 | 6/2012 | Burger et al. | |
| 8,250,555 B1 | 8/2012 | Lee et al. | |
| 8,250,556 B1 | 8/2012 | Lee et al. | |
| 8,312,452 B2 | 11/2012 | Neiger et al. | |
| 8,321,850 B2 | 11/2012 | Bruening et al. | |
| 8,433,885 B2 | 4/2013 | Burger et al. | |
| 8,434,074 B2 | 4/2013 | Janczak et al. | |
| 8,447,911 B2 | 5/2013 | Burger et al. | |
| 8,464,002 B2 | 6/2013 | Burger et al. | |
| 8,583,895 B2 | 11/2013 | Jacobs et al. | |
| 8,589,892 B2 | 11/2013 | Fournier et al. | |
| 8,677,105 B2 | 3/2014 | Abdallah | |
| 8,817,793 B2 | 8/2014 | Mushano | |
| 9,021,241 B2 | 4/2015 | Burger et al. | |
| 9,043,769 B2 | 5/2015 | Vorbach | |
| 9,053,292 B2 | 6/2015 | Abdallah | |
| 10,180,840 B2 | 1/2019 | Burger et al. | |
| 2001/0032308 A1 | 10/2001 | Grochowski et al. | |
| 2002/0016907 A1 | 2/2002 | Grochowski et al. | |
| 2003/0023959 A1 | 1/2003 | Park | |
| 2003/0070062 A1 | 4/2003 | Krishnan et al. | |
| 2003/0088759 A1 | 5/2003 | Wilkerson | |
| 2004/0083468 A1 | 4/2004 | Ogawa et al. | |
| 2004/0139299 A1 | 7/2004 | Busaba et al. | |
| 2004/0193849 A1 | 9/2004 | Dundas | |
| 2004/0216095 A1 | 10/2004 | Wu | |
| 2005/0172277 A1 | 8/2005 | Chheda et al. | |
| 2005/0204348 A1 | 9/2005 | Horning et al. | |
| 2006/0090063 A1 | 4/2006 | Theis | |
| 2007/0226735 A1 | 9/2007 | Nguyen et al. | |
| 2007/0239975 A1 | 10/2007 | Wang | |
| 2007/0260854 A1 | 11/2007 | Smith et al. | |

(56) References Cited

U.S. PATENT DOCUMENTS

| | | | |
|---|---|---|---|
| 2007/0288733 | A1 | 12/2007 | Luick |
| 2008/0109637 | A1 | 5/2008 | Martinez et al. |
| 2009/0013135 | A1 | 1/2009 | Burger et al. |
| 2009/0013160 | A1 | 1/2009 | Burger et al. |
| 2009/0019263 | A1 | 1/2009 | Shen et al. |
| 2009/0106541 | A1 | 4/2009 | Mizuno et al. |
| 2009/0158017 | A1 | 6/2009 | Mutiu et al. |
| 2009/0172365 | A1 | 7/2009 | Orenstien et al. |
| 2009/0172371 | A1 | 7/2009 | Joao et al. |
| 2009/0187739 | A1 | 7/2009 | Nemirovsky et al. |
| 2010/0146209 | A1 | 6/2010 | Burger et al. |
| 2010/0161948 | A1 | 6/2010 | Abdallah |
| 2010/0191943 | A1 | 7/2010 | Bukris |
| 2010/0325395 | A1 | 12/2010 | Burger et al. |
| 2011/0035551 | A1 | 2/2011 | Hooker et al. |
| 2011/0060889 | A1 | 3/2011 | Burger et al. |
| 2011/0072239 | A1 | 3/2011 | Burger et al. |
| 2011/0078424 | A1 | 3/2011 | Boehm et al. |
| 2011/0202749 | A1 | 8/2011 | Jin et al. |
| 2012/0030451 | A1 | 2/2012 | Pong et al. |
| 2012/0084759 | A1 | 4/2012 | Candea et al. |
| 2012/0158647 | A1 | 6/2012 | Yadappanavar et al. |
| 2012/0216012 | A1 | 8/2012 | Vorbach et al. |
| 2012/0246448 | A1 | 9/2012 | Abdallah |
| 2012/0246657 | A1* | 9/2012 | Abdallah .............. G06F 9/5038 718/102 |
| 2012/0303933 | A1 | 11/2012 | Manet et al. |
| 2012/0311306 | A1 | 12/2012 | Mushano |
| 2013/0198499 | A1 | 8/2013 | Dice et al. |
| 2014/0006714 | A1 | 1/2014 | Cherukuri et al. |
| 2014/0136786 | A1 | 5/2014 | Carpenter et al. |
| 2014/0181475 | A1 | 6/2014 | Abdallah |
| 2014/0189239 | A1 | 7/2014 | Hum et al. |
| 2014/0215190 | A1 | 7/2014 | Mylius et al. |
| 2014/0281434 | A1 | 9/2014 | Madriles et al. |
| 2014/0281436 | A1 | 9/2014 | Mohammad |
| 2014/0372736 | A1 | 12/2014 | Greenhalgh |
| 2015/0006452 | A1 | 1/2015 | Kim et al. |
| 2015/0026444 | A1 | 1/2015 | Anderson et al. |
| 2015/0067662 | A1 | 3/2015 | Palalau |
| 2015/0089191 | A1 | 3/2015 | Gonion |
| 2015/0100757 | A1 | 4/2015 | Burger et al. |
| 2015/0127928 | A1 | 5/2015 | Burger et al. |
| 2015/0186293 | A1 | 7/2015 | Lin |
| 2015/0199199 | A1 | 7/2015 | Burger et al. |
| 2015/0199272 | A1 | 7/2015 | Goel et al. |
| 2016/0203081 | A1 | 7/2016 | Kimura |
| 2016/0259645 | A1* | 9/2016 | Wright ................ G06F 9/30145 |
| 2017/0083314 | A1 | 3/2017 | Burger et al. |
| 2017/0083318 | A1 | 3/2017 | Burger et al. |
| 2017/0083319 | A1 | 3/2017 | Burger et al. |
| 2017/0083320 | A1 | 3/2017 | Burger et al. |
| 2017/0083324 | A1 | 3/2017 | Burger et al. |
| 2017/0083327 | A1 | 3/2017 | Burger et al. |
| 2017/0083341 | A1 | 3/2017 | Burger et al. |

FOREIGN PATENT DOCUMENTS

| | | | |
|---|---|---|---|
| JP | 2001175473 | A | 6/2001 |
| JP | 2002149401 | A | 5/2002 |
| JP | 2013500539 | A | 7/2013 |
| WO | WO 2010/147857 | | 12/2010 |
| WO | WO 2013/095635 | | 6/2013 |
| WO | WO 2014/193878 | | 12/2014 |

OTHER PUBLICATIONS

Cain et al., "Memory Ordering: A Value-Based Approach", In Journal of IEEE Micro, vol. 24, Issue 1, Jan. 2004, pp. 110-117.

Duric et al., "Dynamic-Vector Execution on a General Purpose EDGE Chip Multiprocessor," In Proceedings of the 2014 International Conference on Embedded Computers Syhstems: Architectures, Modeling, and Simulation (SAMOS XIV), Jul. 14-17, 2014, 8 pages.

Duric et al., "EVX: Vector Execution on Low Power EDGE Cores," Design, Automation and Test in European Conference and Exhibition, Mar. 24-28, 2014, 4 pages.

Duric et al., "ReCompAc: Reconfigurable compute accelerator," IEEE 2013 International Conference on Reconfigurable Computing and FPGAS (Reconfig), Dec. 9, 2013, 4 pages.

Govindan et al., "Scaling Power and Performance via Processor Composability," IEEE Transaction on Computers, No. 1, Aug. 2014, 14 pages.

Govindaraju et al., "DySER: Unifying Functionality and Parallelism Specialization for Energy-Efficient Computing," IEEE Micro, IEEE Service Center, Sep. 1, 2012, 14 pages.

Gulati et al., "Multitasking Workload Scheduling on Flexible Core Chip Multiprocessors," In Proceedings of the Computer Architecture News, vol. 36, Issue 2, May 2008, 10 pages.

Gupta, "Design Decisions for Tiled Architecture Memory Systems," document marked Sep. 18, 2009, available at: http://cseweb.ucsd.edu/~a2gupta/uploads/2/2/7/3/22734540/researchexam.paper.pdf, 14 pages.

Hao et al., "Increasing the Instruction Fetch Rate via Block-Structured Instruction Set Architectures", In Proceedings of the 29th Annual IEEE/ACM International Symposium on Microarchitecture, Dec. 2, 1996, pp. 191-200.

Ipek et al., "Core Fusion: Accommodating Software Diversity in Chip Multiprocessors", In Proceedings of the 34th annual international symposium on Computer architecture, Jun. 9, 2007, 12 pages.

Kavi, et al., "Concurrency, Synchronization, Speculation—the Dataflow Way", In Journal of Advances in Computers, vol. 96, Nov. 23, 2013, pp. 1-41.

Li et al., "Compiler-assisted Hybrid Operand Communication", In TechReport TR-09-33, Nov. 2009, 12 pages.

Li et al., "Hybrid Operand Communication for Dataflow Processors," document not dated, 10 pages (also published as Li et al., "Hybrid operand communication for dataflow processors," In Workshop on Parallel Execution of Sequential Programs on Multi-core Architectures, pp. 61-71 (2009)).

Liu, "Hardware Techniques to Improve Cache Efficiency," In Dissertation of the University of Texas at Austin, May 2009, 189 pages.

"Load/store architecture," Retrieved on: Sep. 24, 2015; Available at: https://en.wikipedia.org/wiki/Load/store_architecture.

Maher et al., "Merging Head and Tail Duplication for Convergent Hyperblock Formation," In Annual IEEE/ACM International Symposium on Microarchitecture, Dec. 2006, 12 pages.

McDonald et al., "Characterization of TCC on Chip-Multiprocessors," Parallel Architectures and Compilation Techniques, 2005. PACT 2005. 14th International Conference on. IEEE, 2005, 12 pages.

Munshi, et al., "A Parameterizable SIMD Stream Processor", In Proceedings of Canadian Conference on Electrical and Computer Engineering, May 1, 2005, pp. 806-811.

Nagarajan et al., "A Design Space Evaluation of Grid Processor Architectures," In Proceedings of the 34th annual ACM/IEEE international symposium on Microarchitecture, Dec. 1, 2001, pp. 40-51.

Nagarajan, et al., "Static Placement, Dynamic Issue (SPDI) Scheduling for EDGE Architectures", In Proceedings. 13th International Conference on Parallel Architecture and Compilation Techniques, Sep. 29, 2004, 11 pages.

Park et al., "Polymorphic Pipeline Array: A flexible multicore accelerator with virtualized execution for mobile multimedia applications," 42nd Annual IEEE/ACM International Symposium on Microarchitecture, Dec. 12, 2009, 11 pages.

Pengfei, et al., "M5 Based EDGE Architecture Modeling", In Proceedings of IEEE International Conference on Computer Design, Oct. 3, 2010, pp. 289-296.

Pierce et al., "Wrong-Path Instruction Prefetching", In Proceedings of the 29th Annual IEEE/ACM International Symposium on Microarchitecture, Dec. 2, 1996, pp. 1-17.

(56) References Cited

OTHER PUBLICATIONS

Robatmili et al., "Exploiting Criticality to Reduce Bottlenecks in Distributed Uniprocessors," 17th IEEE International Symposium on High-Performance Computer Architecture (HPCA—17), Feb. 2011, 12 pages.
Roesner, "Counting Dependence Predictors," In Undergraduate Honors Thesis, May 2, 2008, 25 pages.
Roesner, et al., "Counting Dependence Predictors", In Proceedings of the 35th Annual International Symposium on Computer Architecture, Jun. 21, 2008, 12 pages.
Sibi et al., "Scaling Power and Performance via Processor Composability," University of Texas at Austin technical report No. TR-10-14 (2010), 20 pages.
Souza et al., "Dynamically Scheduling VLIW Instructions", In Journal of Parallel and Distributed Computing, vol. 60, Jul. 2000, pp. 1480-1511.
Tamches et al., "Dynamic Kernel Code Optimization," In Workshop on Binary Translation, 2001, 10 pages.
Wu et al., "Block Based Fetch Engine for Superscalar Processors", In Proceedings of the 15th International Conference on Computer Applications in Industry and Engineering, Nov. 7, 2002, 4 pages.
Zmily, "Block-Aware Instruction Set Architecture", In Doctoral Dissertation, Jun. 2007, 176 pages.
Zmily et al., "Block-Aware Instruction Set Architecture", In Proceedings of ACM Transactions on Architecture and Code Optimization, vol. 3, Issue 3, Sep. 2006, pp. 327-357.
Zmily, et al., "Improving Instruction Delivery with a Block-Aware ISA", In Proceedings of 11th International Euro-Par Conference on Parallel Processing, Aug. 30, 2005, pp. 530-539.
Bouwens et al., "Architecture Enhancements for the ADRES Coarse-Grained Reconfigurable Array," High Performance Embedded Architectures and Compilers, Springer Berlin Heidelberg pp. 66-81 (2008).
Burger et al., "Design and Implementation of the TRIPS EDGE Architecture", In Proceedings of the 32nd Annual International Symposium on Computer Architecture, Jun. 4, 2005, pp. 1-41.
Burger et al., "Scaling to the End of Silicon with EDGE Architectures," In Proceedings of Computer, vol. 37, Issue 7, Jul. 1, 2004, pp. 44-55.
Coons et al., "A Spatial Path Scheduling Algorithm for EDGE Architectures," In Proceedings of the 12th International Conference on Architectural Support for Programming Languages and Operating Systems (ASPLOS), Oct. 12, 2006, 12 pages.
Desikan et al., "Scalable Selective Re-Execution for EDGE Architectures," In Proceedings of the 11th International Conference on Architectural Support for Programming Languages and Operating Systems, Oct. 9, 2004, 13 pages.
"Explicit Data Graph Execution", Retrieved on: Aug. 31, 2015 Available at: http://en.wikipedia.org/wiki/Explicit_Data_Graph_Execution.
Fallin, et al., "The Heterogeneous Block Architecture", In Proceedings of 32nd IEEE International Conference on Computer Design, Oct. 19, 2014, pp. 1-8.
Gebhart et al., "An Evaluation of the TRIPS Computer System," In Proceedings of the 14th international conference on Architectural support for programming languages and operating systems, Mar. 7, 2009, 12 pages.
Govindan, "E3:Energy-Efficient EDGE Architectures", In Dissertation, Aug. 2010, 244 pages.
Gray and Smith, "Towards an Area-Efficient Implementation of a High ILP EDGE Soft Processor: Comparing Out-of-Order Dataflow Instruction Scheduler Designs," poster temporarily on display during the 22nd IEEE International Symposium on Field-Programmable Custom Computing Machines, May 11-13, 2014, Boston, Massachusetts (poster on display for approximately 1-2 hours, and less than one day, May 2014).
Huang et al., "Compiler-Assisted Sub-Block Reuse," Retrieved on: Apr. 9, 2015; available at: http://citeseerx.ist.psu.edu/viewdoc/download?doi=10.1.1.33.155&rep=rep1&type=pdf (also published as Huang & Lilja, "Compiler-Assisted Sub-Block Reuse," UMSI ResearchReport/University of Minnesota Supercomputer Institute 73 (2000)).
Huang, "Improving Processor Performance Through Compiler-Assisted Block Reuse," In Doctoral Dissertation, May, 2000, 125 pages.
Keckler et al., "Tera-Op Reliable Intelligently Adaptive Processing System (Trips)," In AFRL-IF-WP-TR-2004-1514, document dated Apr. 2004, 29 pages.
Kim et al., "Composable Lightweight Processors," 13 pages (document also published as Kim, et al., "Composable lightweight processors," 40th Annual IEEE/ACM International Symposium on Microarchitecture (MICRO 2007), pp. 381-394, (2007)).
Kozumplik, et al., "TRIPS to the Semantic EDGE", Retrieved on: Sep. 22, 2015, Available at: http://vbn.aau.dk/ws/files/61072300/1212050422.pdf.
Li et al., "Code Layout Optimization for Defensiveness and Politeness in Shared Cache," 11 pages, (also published as Li, et al, "Code Layout Optimization for Defensiveness and Politeness in Shared Cache" 43rd International Conference on Parallel Processing (ICPP), IEEE, pp. 151-161 (2014)).
Maher, "Atomic Block Formation for Explicit Data Graph Execution Architectures", In Dissertation of Doctor of Philosophy, Aug. 2010, 185 pages.
McDonald et al., "TRIPS Processor Reference Manual," In Technical Report TR-05-19, document marked Mar. 10, 2005, 194 pages.
Mei et al., "ADRES: An Architecture with Tightly Coupled VLIW Processor and Coarse-Grained Reconfiguration Matrix," 10 pages, (also published as Mei, et al. "ADRES: An architecture with tightly coupled VLIW processor and coarse-grained reconfigurable matrix," In Proceedings of 13th International Conference on Field-Programmable Logic and Applications, pp. 61-70 (Sep. 2003)).
Melvin et al., "Enhancing Instruction Scheduling with a Block-Structured ISA," International Journal of Parallel Programming, vol. 23, No. 3, Jun. 1995, 23 pages.
Microsoft Research, "E2," document downloaded on Apr. 10, 2015 from http://research.microsoft.com/en-us/projects/e2/.
Nagarajan et al., "Critical Path Analysis of the TRIPS Architecture," In IEEE International Symposium on Performance Analysis of Systems and Software, Mar. 19, 2006, 11 pages.
Putnam et al., "Dynamic Vectorization in the E2 Dynamic Multicore Architecture," 6 pages (also published as Putnam, et al., "Dynamic vectorization in the E2 dynamic multicore architecture" ACM SIGARCH Computer Architecture News pp. 27-32. (2011)).
Robatmili et al., "How to Implement Effective Prediction and Forwarding for Fusable Dynamic Multicore Architectures," In Proceedings of the 19th IEEE International Symposium on High-Performance Computer Architecture, Feb. 23, 2013, 12 pages.
Sankaralingam et al., "Distributed Microarchitectural Protocols in the TRIPS Prototype Processor," 12 pages (also published as "Distributed Microarchitectural Protocols in the TRIPS Prototype Processor," Proceedings of 39th Annual IEEE/ACM International Symposium on Microarchitecture, pp. 480-491 (2006)).
Sankaralingam et al., "Exploiting ILP, TLP, and DLP with Polymorphous TRIPS Architecture," In Proceedings of the 30th Annual International Symposium on Computer Architecture, Jun. 9, 2003, 12 pages.
Sankaralingam, "Polymorphous Architectures: A Unified Approach for Extracting Concurrency of Different Granularities", In Doctoral Dissertation of Philosophy, Aug. 2007, 276 pages.
Sankaralingam, et al., "TRIPS: A Polymorphous Architecture for Exploiting ILP, TLP, and DLP", In Journal of ACM Transactions on Architecture and Code Optimization, vol. 1, No. 1, Mar. 2004, pp. 62-93.
Sethumadhavan et al., "Design and Implementation of the TRIPS Primary Memory System," In Proceedings of International Conference on Computer Design, Oct. 1, 2006, 7 pages.
Smith et al., "Compiling for EDGE Architectures," In Proceedings of International Symposium on Code Generation and Optimization, Mar. 26, 2006, 11 pages.
Smith et al., "Dataflow Predication", In Proceedings of 39th Annual IEEE/ACM International Symposium on Microarchitecture, Dec. 9, 2006, 12 pages.

(56) References Cited

OTHER PUBLICATIONS

Smith, "Explicit Data Graph Compilation," In Thesis, Dec. 2009, 201 pages.
Smith, "TRIPS Application Binary Interface (ABI) Manual," Technical Report TR-05-22, Department of Computer Sciences, The University of Texas at Austin, Technical Report TR-05-22, document marked Oct. 10, 2006, 16 pages.
International Search Report and Written Opinion for PCT/US2016/051410, dated Jan. 2, 2017, pp. 1-11.
PCT Chapter II Demand for International Preliminary Examination and amended claims under Article 34 submitted to the European Patent Office on Jun. 26, 2017, for PCT/US2016/051410, pp. 1-7.
Written Opinion of the International Preliminary Examining Authority for PCT/US2016/051408, dated Aug. 25, 2017, pp. 1-6.
"Non Final Office Action Issued in U.S. Appl. No. 15/012,674", dated Jun. 25, 2017, 10 Pages.
"Very Long Instruction Word", Retrieved From: http://en.wikipedia.org/wiki/Verylong_instruction_word, Feb. 13, 2013, 7 Pages.
"Final Office Action Issued in U.S. Appl. No. 14/757,944", dated Jul. 9, 2018, 18 Pages.
"Non Final Office Action Issued in U.S. Appl. No. 14/757,944", dated Sep. 21, 2017, 21 Pages.
August, et al., "A Framework for Balancing Control Flow and Predication", In IEEE/ACM 30th Annual International Symposium on Microarchitecture, Dec. 3, 1997, 12 Pages.
Chang, et al., "Using Predicated Execution to Improve the Performance of a Dynamically Scheduled Machine with Speculative Execution", In International Journal of Parallel Programming, vol. 24, Issue 3, Jun. 1996, 11 Pages.
Chuang, et al., "Predicate Prediction for Efficient Out-of-Order Execution". In Proceedings of the 17th Annual International Conference on Supercornputing, Jun. 23, 2003, 10 Pages.
Coons, et al., "Optimal Huffman Tree—Height Reduction for Instruction-Level Parallelism", In Technical Report TR-08-34, Aug. 2007, 26 Pages.
Ebcioglu, et al., "An Eight-Issue Tree—VLIW Processor for Dynamic Binary Translation", In Proceedings of the International Conference on Computer Design, Nov. 1998. 9 Pages.
Ferrante, et al., "The Program Dependence Graph and Its Use in Optimization", In Proceedings of ACM Transactions on Programming Languages and Systems, vol. 9, Issue 3, Jul. 1, 1987, 31 Pages.
Havanki, et al., "Treegion Scheduling for Wide Issue Processors", In Proceedings of the 4th International Symposium on High-Performance Computer Architecture, Feb. 1, 1998, 11 Pages.
Huh, et al., "A NUCA Substrate for Flexible CMP Cache Sharing", In Proceedings of 19th International Conference on Supercomputing, Jun. 20, 2005, 10 Pages.
Mahlke, et al., "Effective Compiler Support for Predicated Execution Using the Hyperblock", In Proceedings of the 25th Annual International Symposium on Microarchitecture, Dec. 1992, 10 Pages.
Mahlke, Scott Alan, "Exploiting Instruction Level Parallelism in the Presence of Conditional Branches", In Doctoral Dissertation Submitted in the Department of Electrical and Computer Engineering, Sep. 1996, 292 Pages.
Mai, et al., "Smart Memories: A Modular Reconfigurable Architecture", In Proceedings of the 27th International Symposium on Computer Architecture, Jun. 14, 2011, 11 Pages.
McDonald, et al., "The Design and Implementation of the TRIPS Prototype Chip", In IEEE Hot Chips XVII Symposium (HCS), Aug. 17, 2005, 24 Pages.
Moreno, et al., "Scalable Instruction-level Parallelism through Tree-Instructions", In Proceedings of the 11th International Conference on Supercomputing, Jul. 11, 1997, 14 Pages.
Netto, et al., "Code Compression to Reduce Cache Accesses", In Technical Report-IC-03-023, Nov. 2003, 15 Pages.
Pan, et al., "High Performance, Variable-Length Instruction Encodings", In Doctoral Dissertation, Massachusetts Institute of Technology, May 2002, 53 Pages.

Parcerisa, et al., "Design of Clustered Superscalar Microarchitectures", In Thesis Submitted to Polytechnic University of Catalunya, Barcelona (Spain), Apr. 2004, 28 Pages.
"International Search Report and Written Opinion Issued in PCT Application No. PCT/US2016/051207", dated Dec. 16, 2016, 11 Pages.
Pnevmatikatos, et al., "Guarded Execution and Branch Prediction in Dynamic ILP Processors", In Proceedings of the 21st Annual International Symposium on Computer Architecture, Apr. 1994, 11 Pages.
Quinones, et al., "Improving Branch Predication and Predicated Execution in Out-of-Order Processors", In IEEE 13th International Symposium on High Performance Computer Architecture, Feb. 2007, 10 Pages.
Quinones, et al., "Selective Predicate Prediction for Out-of-Order Processors", In Proceedings of the 20th Annual International Conference on Supercomputing, Jun. 28, 2009, 9 Pages.
Ranganathan, Nitya, "Control Flow Speculation for Distributed Architectures", In Dissertation Presented to the Faculty of the Graduate School of the University of Texas at Austin, May 2009, 40 Pages.
Ros, et al., "A Hamming Distance Based VLIW/EPIC Code Compression Technique", In Proceedings of the International Conference on Compilers, Architecture, and Synthesis for Embedded Systems, Sep. 22, 2004, 8 Pages.
Sankaralingam, et al., "Universal Mechanisms for Data-Parallel Architectures", In Proceedings of the 36th International Symposium on Microarchitecture, Dec. 3, 2003, 12 Pages.
Simon, et al., "Incorporating Predicate Information Into Branch Predictors", In Proceedings of the 9th International Symposium on High-Performance Computer Architecture, Feb. 2003, 12 Pages.
Sohi, et al., "High-Bandwidth Data Memory Systems for Superscalar Processors", In Proceedings of the 4th International Conference on Architectural Support for Programming Languages and Operating Systems, Apr. 1991, 8 Pages.
Uht, et al., "Disjoint Eager Execution: An Optimal Form of Speculative Execution", In Proceedings of the 28th International Symposium on Microarchitecture, Nov. 1995, 13 Pages.
Wilson, et al., "Designing High Bandwidth On-Chip Caches", In Proceedings of the 24th Annual International Symposium on Computer Architecture, Jun. 1997, 12 Pages.
Xie, et al., "A Code Decompression Architecture for VLIW Processors", In Proceedings of 34th ACM/IEEE International Symposium on Microarchitecture, Dec. 1, 2001, 10 Pages.
"Non Final Office Action Issued in U.S. Appl. No. 14/757,941", dated Jan. 11, 2019, 16 Pages.
"Final Office Action Issued in U.S. Appl. No. 14/942,345", dated Dec. 31, 2018, 14 Pages.
"Non Final Office Action Issued in U.S. Appl. No. 14/942,461", dated Jan. 18, 2019, 9 Pages.
"Final Office Action Issued in U.S. Appl. No. 14/942,557", dated Dec. 31, 2018, 16 Pages.
"Non Final Office Action Issued in U.S. Appl. No. 15/073,365", dated Dec. 4, 2018, 13 Pages.
"Final Office Action Issued in U.S. Appl. No. 15/074,938", dated Dec. 3, 2018, 9 Pages.
Salzman, et al., "The Art of Debugging with GDB and DDD", In Book—The Art of Debugging with GDB and DDD, No Starch Press Publication, Sep. 2008, 27 Pages.
"Non Final Office Action Issued in U.S. Appl. No. 14/921,855", dated Apr. 7, 2019, 28 Pages.
"Non Final Office Action Issued in U.S. Appl. No. 14/921,855", dated May 27, 2020, 29 Pages.
"Final Office Action Issued in U.S. Appl. No. 15/012,674", dated Mar. 23, 2020, 12 Pages.
"Final Office Action Issued in U.S. Appl. No. 14/921,855", dated Sep. 20, 2019, 11 Pages.
"Office Action Issued in European Patent Application No. 167668151.1", dated Nov. 14, 2019, 15 Pages.
"Office Action Issued in European Patent Application No. 16766815.1", dated Aug. 3, 2020, 8 pages.

* cited by examiner

FIG. 5
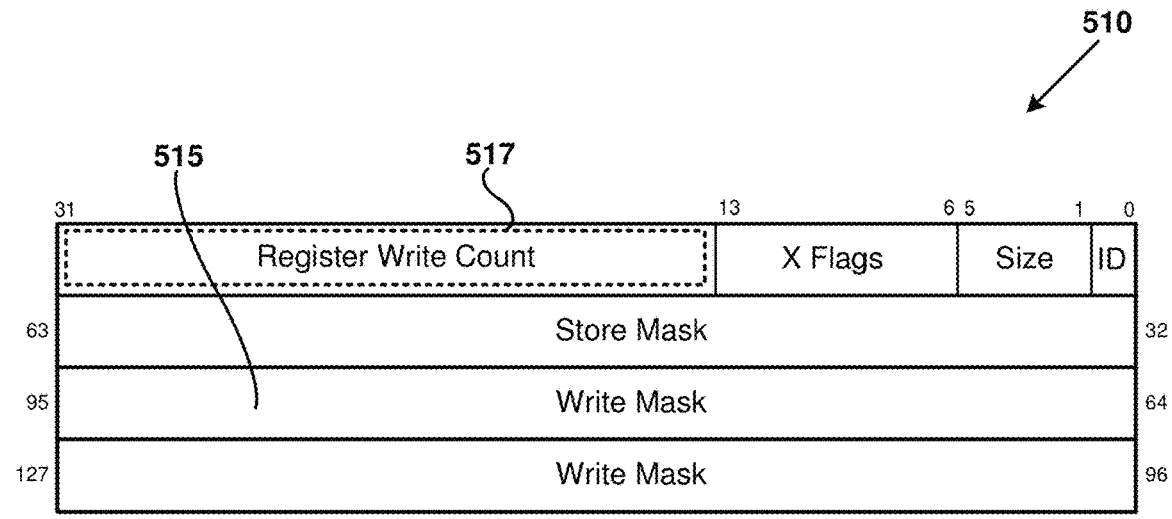
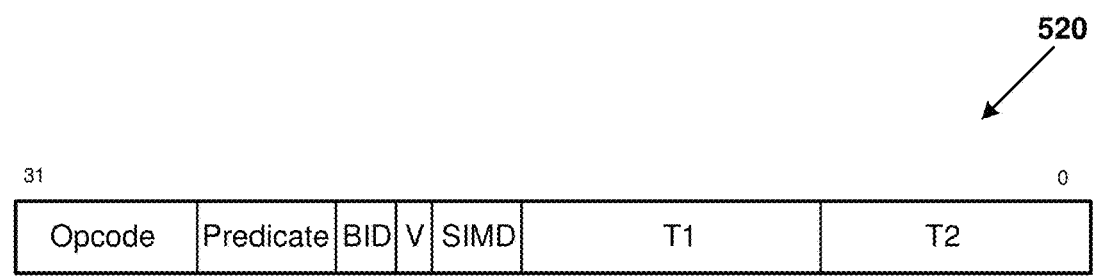
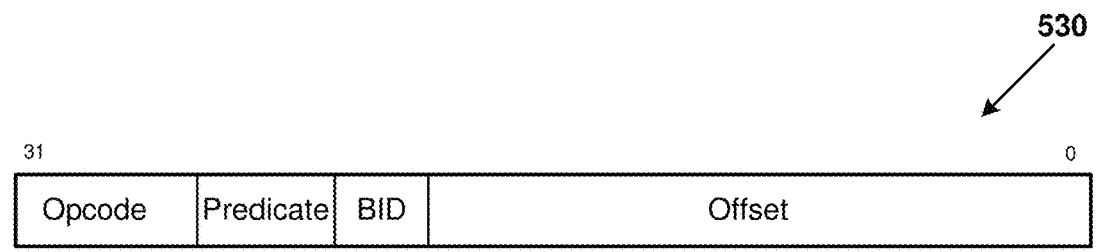
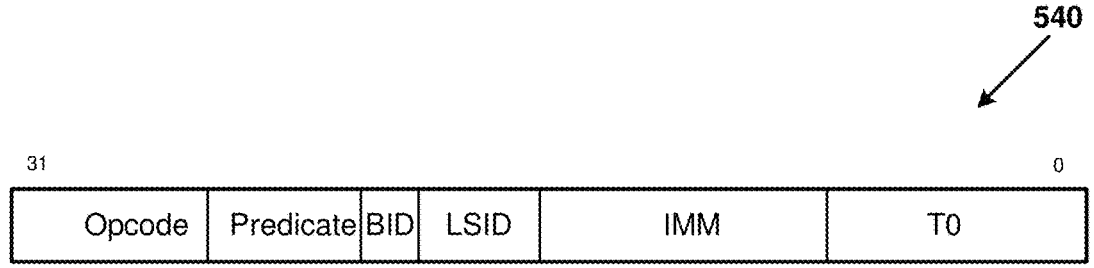

```
// IB0
for(i=0; i<n; ++i) {
// IB1
    if(i<=1) {
        next=i;
    } else {
        next=a+b;
        a=b;
        b=next;
    }
    fib=next;
    if(i!=fib) {
        print_val(fib);
    } else {
        continue;
    }
    c++;
} n++;
. . .
```

920

```
// IB1
// R4->next, R5->fib, R6->n, R7-> c, R32->call return slot
 0: readl   R1        T[3R] T[4R]    // i
 1: readl   R2        T[5R]          // a
 2: readl   R3        T[5L] T[7R]    // b
 3: tltei   #1        B1P            // i<=1 ?
 4: mov_t   B1P       R4 R5          // R4=next=i; R5=fib=next;
 5: add               T[6R] T[8R]    // a+b
 6: mov_f   B1P       R4 R5          // R4=next=a+b R5=fib=next;
 7: mov_f   B1P       R2             // a=b
 8: mov_f   B1P       R3 T[10R]      // b=next=a+b
 9: readl   R1        T[10L]         // i
10: tne               T[11R] T[12P]  // i!=fib
11: mov               T[13P] T[14P]
12: call_t            PRINT_VAL:     // print(fib)
13: movi_t  IB2       R32            // write address IB2 into return slot
14: bro_f             IB0:           // continue
```

_US 10,871,967 B2_

REGISTER READ/WRITE ORDERING

CROSS-REFERENCE TO RELATED APPLICATIONS

This application claims the benefit of U.S. Provisional Patent Application No. 62/221,003, entitled "BLOCK-BASED PROCESSORS," filed Sep. 19, 2015, which application is incorporated herein by reference in its entirety.

BACKGROUND

Microprocessors have benefited from continuing gains in transistor count, integrated circuit cost, manufacturing capital, clock frequency, and energy efficiency due to continued transistor scaling predicted by Moore's law, with little change in associated processor Instruction Set Architectures (ISAs). However, the benefits realized from photolithographic scaling, which drove the semiconductor industry over the last 40 years, are slowing or even reversing. Reduced Instruction Set Computing (RISC) architectures have been the dominant paradigm in processor design for many years. Out-of-order superscalar implementations have not exhibited sustained improvement in area or performance. Accordingly, there is ample opportunity for improvements in processor ISAs to extend performance improvements.

SUMMARY

Methods, apparatus, and computer-readable storage devices are disclosed for configuring, operating, and compiling code for, block-based processor architectures (BB-ISAs), including explicit data graph execution (EDGE) architectures. The described techniques and tools for solutions for, e.g., improving processor performance and/or reducing energy consumption can be implemented separately, or in various combinations with each other. As will be described more fully below, the described techniques and tools can be implemented in a digital signal processor, microprocessor, application-specific integrated circuit (ASIC), a soft processor (e.g., a microprocessor core implemented in a field programmable gate array (FPGA) using reconfigurable logic), programmable logic, or other suitable logic circuitry. As will be readily apparent to one of ordinary skill in the art, the disclosed technology can be implemented in various computing platforms, including, but not limited to, servers, mainframes, cellphones, smartphones, PDAs, handheld devices, handheld computers, PDAs, touch screen tablet devices, tablet computers, wearable computers, and laptop computers.

In one example of the disclosed technology, a block-based processor is configured to control the order in which register access instructions (e.g., register read and register write instructions) based on a hardware structure storing data indicating the relative ordering of the register access instructions. In some examples, a write mask is generated when decoding an instruction block or read directly from an instruction block header and stored in the hardware structure. In some examples, the register access instructions are encoded with an identifier of a particular register in a register file that is read from or written to. In some examples, a compiler or interpreter transforms source code and/or object code to executable code for a block-based processor, including instruction blocks with headers including register write mask data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures.

BRIEF DESCRIPTION OF THE DRAWINGS

FIG. 5 illustrates block-based processor headers and instructions, as can be used in some examples of the disclosed technology.

FIG. 9 illustrates example source and assembly code, as can be used in certain examples of the disclosed technology.

DETAILED DESCRIPTION

I. General Considerations

Figure 1:
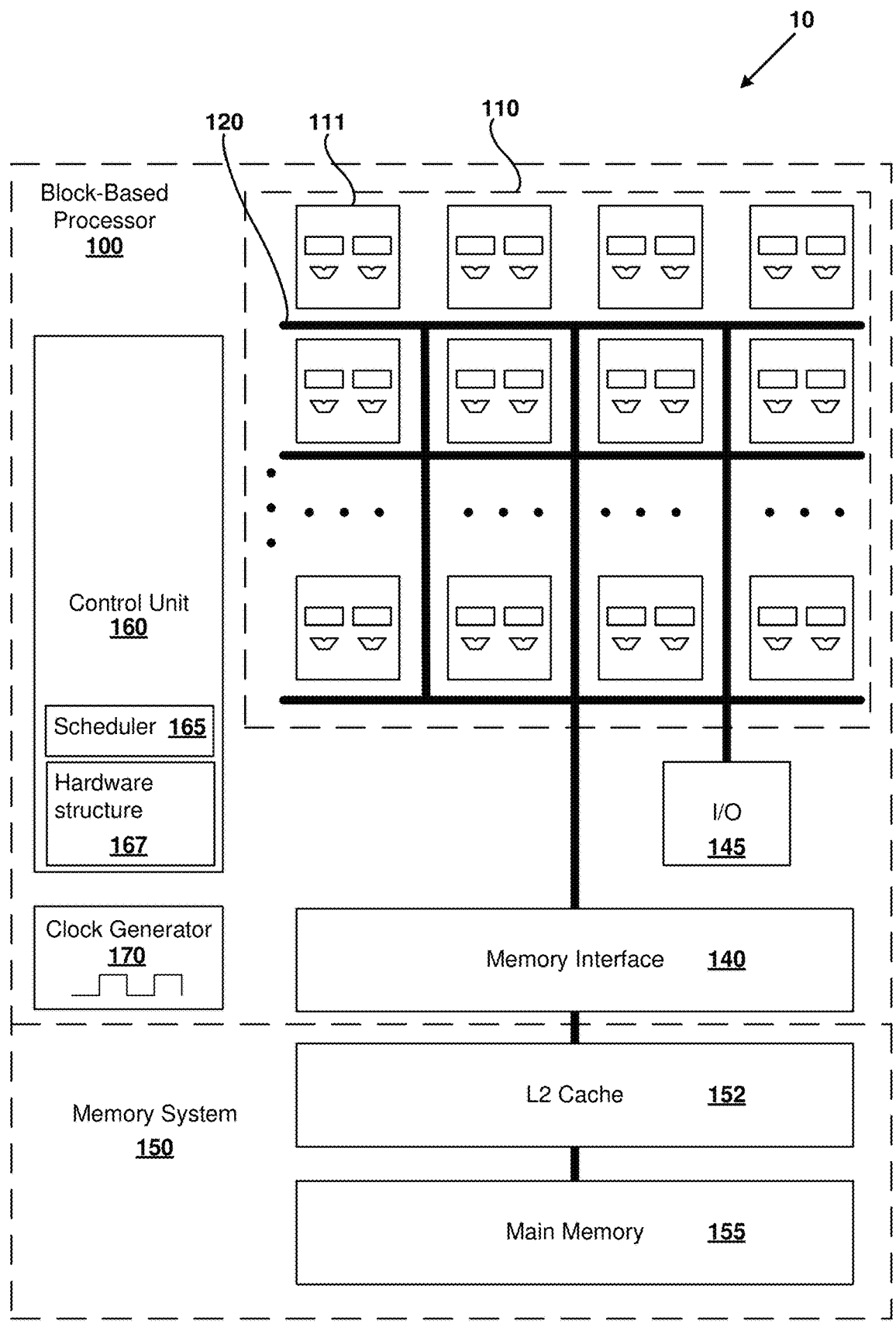
FIG. 1 illustrates a block-based processor core, as can be used in some examples of the disclosed technology.

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "emit," "verify," "execute," and "initiate" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., computer-readable storage media). The computer-executable instructions can be part of, for example, a dedicated software application or a software application that is accessed or downloaded via a web browser or other software application (such as a remote computing application). Such software can be executed, for example, on a single local computer (e.g., with general-purpose and/or block based processors executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technologies

Superscalar out-of-order microarchitectures employ substantial circuit resources to rename registers, schedule instructions in dataflow order, clean up after miss-speculation, and retire results in-order for precise exceptions. This includes expensive circuits, such as deep, many-ported register files, many-ported content-accessible memories (CAMs) for dataflow instruction scheduling wakeup, and many-wide bus multiplexers and bypass networks, all of which are resource intensive. For example, FPGA-based implementations of multi-read, multi-write RAMs typically require a mix of replication, multi-cycle operation, clock doubling, bank interleaving, live-value tables, and other expensive techniques.

The disclosed technologies can realize performance enhancement through application of techniques including high instruction-level parallelism (ILP), out-of-order (OoO), superscalar execution, while avoiding substantial complexity and overhead in both processor hardware and associated software. In some examples of the disclosed technology, a block-based processor uses an EDGE ISA designed for area- and energy-efficient, high-ILP execution. In some examples, use of EDGE architectures and associated compilers finesses away much of the register renaming, CAMs, and complexity.

In certain examples of the disclosed technology, an EDGE ISA can eliminate the need for one or more complex architectural features, including register renaming, dataflow analysis, misspeculation recovery, and in-order retirement while supporting mainstream programming languages such as C and C++. In certain examples of the disclosed technology, a block-based processor executes a plurality of two or more instructions as an atomic block. Block-based instructions can be used to express semantics of program data flow and/or instruction flow in a more explicit fashion, allowing for improved compiler and processor performance. In certain examples of the disclosed technology, an explicit data graph execution instruction set architecture (EDGE ISA) includes information about program control flow that can be used to improve detection of improper control flow instructions, thereby increasing performance, saving memory resources, and/or and saving energy.

In some examples of the disclosed technology, instructions organized within instruction blocks are fetched, executed, and committed atomically. Instructions inside blocks execute in dataflow order, which reduces or eliminates using register renaming and provides power-efficient OoO execution. A compiler can be used to explicitly encode data dependencies through the ISA, reducing or eliminating burdening processor core control logic from rediscovering dependencies at runtime. Using predicated execution, intra-block branches can be converted to dataflow instructions, and dependencies, other than memory dependencies, can be limited to direct data dependencies. Disclosed target form encoding techniques allow instructions within a block to communicate their operands directly via operand buffers, reducing accesses to a power-hungry, multi-ported physical register files.

Between instruction blocks, instructions can communicate using memory and registers. Registers are typically limited to a relatively small number (e.g., 16, 32, 64, or 128 registers) of architecturally-defined registers and are configured so that data stored in the registers can be quickly accessed by execution units of one or more processor cores. In many examples, the registers are implemented with a small array of full-rail voltage storage units (e.g., flip-flops or latches) that do not require sense amplifiers or other specialized memory addressing and decoding technologies typically used in SRAMs or DRAMs. The registers can thus be used to quickly pass data between instruction blocks executing on different instruction windows and/or different processor cores. In contrast, memories (e.g., memory storing data for an memory space defined by the architecture) are typically arranged such that there are millions, billions, or more addressable locations. Such memories, including main memory, are typically implemented using denser storage technology such as SRAM or DRAM, have one or more layers of caching, and require specialized circuitry to read low voltage values to determine the data values stored in the memory. Using such memory to implement registers will typically increase access latency.

Apparatus, methods, and computer-readable storage media are disclosed for generation and use of register access instruction order encodings for block-based processors. In certain examples of the disclosed technology, instruction blocks include an instruction block header and a plurality of instructions. In other words, the executed instructions of the instruction block affect the state, or do not affect the state as an atomic transactional unit.

In some examples of the disclosed technology, a hardware structure stores data indicating register dependencies to be adhered to for a number of register access instructions, including register read and register write instructions. A control unit coupled to a processor core controls issuance of register access instructions based at least in part on data stored in the hardware structure. Thus, register read/write hazards can be avoided, while allowing for instructions in an instruction block to execute as soon as their dependencies are available. In some examples, the control unit includes wakeup and selection logic used to determine when register access instructions issue to a load/store queue.

As will be readily understood to one of ordinary skill in the relevant art, a spectrum of implementations of the disclosed technology are possible with various area and performance tradeoffs.

III. Example Block-Based Processor

FIG. 1 is a block diagram 10 of a block-based processor 100 as can be implemented in some examples of the disclosed technology. The processor 100 is configured to execute atomic blocks of instructions according to an instruction set architecture (ISA), which describes a number of aspects of processor operation, including a register model, a number of defined operations performed by block-based instructions, a memory model, interrupts, and other architectural features. The block-based processor includes a plurality of processing cores 110, including a processor core 111.

As shown in FIG. 1, the processor cores are connected to each other via core interconnect 120. The core interconnect 120 carries data and control signals between individual ones of the cores 110, a memory interface 140, and an input/output (I/O) interface 145. The core interconnect 120 can transmit and receive signals using electrical, optical, magnetic, or other suitable communication technology and can provide communication connections arranged according to a number of different topologies, depending on a particular desired configuration. For example, the core interconnect 120 can have a crossbar, a bus, a point-to-point bus, or other suitable topology. In some examples, any one of the cores 110 can be connected to any of the other cores, while in other examples, some cores are only connected to a subset of the other cores. For example, each core may only be connected to a nearest 4, 8, or 20 neighboring cores. The core interconnect 120 can be used to transmit input/output data to and from the cores, as well as transmit control signals and other information signals to and from the cores. For example, each of the cores 110 can receive and transmit semaphores that indicate the execution status of instructions currently being executed by each of the respective cores. In some examples, the core interconnect 120 is implemented as wires connecting the cores 110, and memory system, while in other examples, the core interconnect can include circuitry for multiplexing data signals on the interconnect wire(s), switch and/or routing components, including active signal drivers and repeaters, or other suitable circuitry. In some examples of the disclosed technology, signals transmitted within and to/from the processor 100 are not limited to full swing electrical digital signals, but the processor can be configured to include differential signals, pulsed signals, or other suitable signals for transmitting data and control signals.

In the example of FIG. 1, the memory interface 140 of the processor includes interface logic that is used to connect to additional memory, for example, memory located on another integrated circuit besides the processor 100. An external memory system 150 includes an L2 cache 152 and main memory 155. In some examples the L2 cache can be implemented using static RAM (SRAM) and the main memory 155 can be implemented using dynamic RAM (DRAM). In some examples the memory system 150 is included on the same integrated circuit as the other components of the processor 100. In some examples, the memory interface 140 includes a direct memory access (DMA) controller allowing transfer of blocks of data in memory without using register file(s) and/or the processor 100. In some examples, the memory interface manages allocation of virtual memory, expanding the available main memory 155.

The I/O interface 145 includes circuitry for receiving and sending input and output signals to other components, such as hardware interrupts, system control signals, peripheral interfaces, co-processor control and/or data signals (e.g., signals for a graphics processing unit, floating point coprocessor, physics processing unit, digital signal processor, or other co-processing components), clock signals, semaphores, or other suitable I/O signals. The I/O signals may be synchronous or asynchronous. In some examples, all or a portion of the I/O interface is implemented using memory-mapped I/O techniques in conjunction with the memory interface 140.

The block-based processor 100 can also include a control unit 160. The control unit 160 supervises operation of the processor 100. Operations that can be performed by the control unit 160 can include allocation and de-allocation of cores for performing instruction processing, control of input data and output data between any of the cores, register files, the memory interface 140, and/or the I/O interface 145, modification of execution flow, and verifying target location(s) of branch instructions, instruction headers, and other changes in control flow. The control unit 160 can generate and control the processor according to control flow and metadata information representing exit points and control flow probabilities for instruction blocks. The control unit 160 can control issuing of register read and write instructions according to any of the disclosed methods, including use of register read masks, register write masks, and/or write vector registers.

The control unit 160 can also process hardware interrupts, and control reading and writing of special system registers, for example the program counter stored in one or more register file(s). In some examples of the disclosed technology, the control unit 160 is at least partially implemented using one or more of the processing cores 110, while in other examples, the control unit 160 is implemented using a non-block-based processing core (e.g., a general-purpose RISC processing core coupled to memory). In some examples, the control unit 160 is implemented at least in part using one or more of: hardwired finite state machines, programmable microcode, programmable gate arrays, or other suitable control circuits. In alternative examples, control unit functionality can be performed by one or more of the cores 110.

The control unit 160 includes a scheduler 165 that is used to allocate instruction blocks to the processor cores 110. As used herein, scheduler allocation refers to directing operation of an instruction blocks, including initiating instruction block mapping, fetching, decoding, execution, committing, aborting, idling, and refreshing an instruction block. Processor cores 110 are assigned to instruction blocks during instruction block mapping. The recited stages of instruction operation are for illustrative purposes, and in some examples of the disclosed technology, certain operations can be combined, omitted, separated into multiple operations, or additional operations added. The scheduler 165 schedules the flow of instructions including allocation and de-allocation of cores for performing instruction processing, control of input data and output data between any of the cores, register files, the memory interface 140, and/or the I/O interface 145. The control unit 160 also includes memory access instruction hardware structure 167, which can be used to store data including a register write mask, register read mask, and a write vector register, as discussed in further detail below.

The block-based processor 100 also includes a clock generator 170, which distributes one or more clock signals to various components within the processor (e.g., the cores 110, interconnect 120, memory interface 140, and I/O interface 145). In some examples of the disclosed technology, all of the components share a common clock, while in other examples different components use a different clock, for example, a clock signal having differing clock frequencies. In some examples, a portion of the clock is gated to allowing power savings when some of the processor components are not in use. In some examples, the clock signals are generated using a phase-locked loop (PLL) to generate a signal of fixed, constant frequency and duty cycle. Circuitry that receives the clock signals can be triggered on a single edge (e.g., a rising edge) while in other examples, at least some of the receiving circuitry is triggered by rising and falling clock edges. In some examples, the clock signal can be transmitted optically or wirelessly.

IV. Example Block-Based Processor Core

Figure 2:
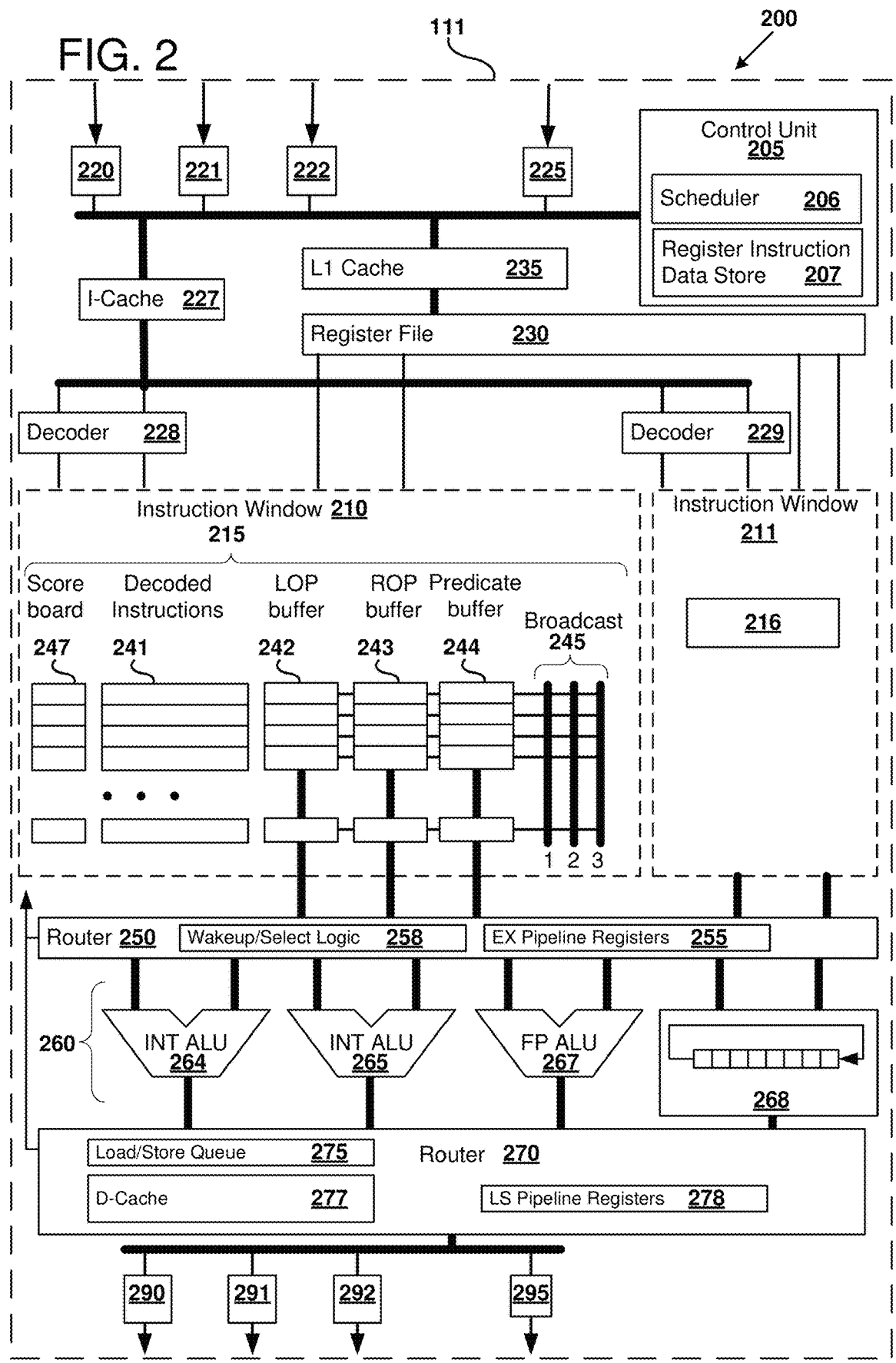
FIG. 2 illustrates a block-based processor core, as can be used in some examples of the disclosed technology.

FIG. 2 is a block diagram further detailing an example microarchitecture for the block-based processor 100, and in particular, an instance of one of the block-based processor cores, as can be used in certain examples of the disclosed technology. For ease of explanation, the exemplary block-based processor core is illustrated with five stages: instruction fetch (IF), decode (DC), operand fetch, execute (EX), and memory/data access (LS). However, it will be readily understood by one of ordinary skill in the relevant art that modifications to the illustrated microarchitecture, such as adding/removing stages, adding/removing units that perform operations, and other implementation details can be modified to suit a particular application for a block-based processor.

As shown in FIG. 2, the processor core 111 includes a control unit 205, which generates control signals to regulate core operation and schedules the flow of instructions within the core using an instruction scheduler 206. Operations that can be performed by the control unit 205 and/or instruction scheduler 206 can include generating and using generating and using memory access instruction encodings, allocation and de-allocation of cores for performing instruction processing, control of input data and output data between any of the cores, register files, the memory interface 140, and/or the I/O interface 145. The control unit can also control the load-store queue, scheduler, global control unit, other units, or a combination of these units used to determine the rate and order of instruction issue.

In some examples, the instruction scheduler 206 is implemented using a general-purpose processor coupled to memory, the memory being configured to store data for scheduling instruction blocks. In some examples, instruction scheduler 206 is implemented using a special purpose processor or using a block-based processor core coupled to the memory. In some examples, the instruction scheduler 206 is implemented as a finite state machine coupled to the memory. In some examples, an operating system executing on a processor (e.g., a general-purpose processor or a block-based processor core) generates priorities, predictions, and other data that can be used at least in part to schedule instruction blocks with the instruction scheduler 206. As will be readily apparent to one of ordinary skill in the relevant art, other circuit structures, implemented in an integrated circuit, programmable logic, or other suitable logic can be used to implement hardware for the instruction scheduler 206.

The control unit 205 further includes memory (e.g., in an SRAM or register) for storing control flow information and metadata. For example, data for register access instruction order can be stored in a hardware structure such as a register instruction data store 207. The register instruction data store 207 can store data for a write mask (e.g., generated by copying data encoded in an instruction block or by an instruction decoder when decoding register access instructions), a register write vector register (e.g., storing data indicating which and what types of register access instructions have executed), and masked store vector register data (e.g., data generated by comparing the write mask to the register write vector register and/or a register read mask). In some examples, the register instruction data store 207 includes a counter that tracks the number and type of register access instructions that have executed.

The control unit 205 can also process hardware interrupts, and control reading and writing of special system registers, for example the program counter stored in one or more register file(s). In other examples of the disclosed technology, the control unit 205 and/or instruction scheduler 206 are implemented using a non-block-based processing core (e.g., a general-purpose RISC processing core coupled to memory). In some examples, the control unit 205 and/or instruction scheduler 206 are implemented at least in part using one or more of: hardwired finite state machines, programmable microcode, programmable gate arrays, or other suitable control circuits.

The exemplary processor core 111 includes two instructions windows 210 and 211, each of which can be configured to execute an instruction block. In some examples of the disclosed technology, an instruction block is an atomic collection of block-based-processor instructions that includes an instruction block header and a plurality of one or more instructions. As will be discussed further below, the instruction block header includes information that can be used to further define semantics of one or more of the plurality of instructions within the instruction block. Depending on the particular ISA and processor hardware used, the instruction block header can also be used during execution of the instructions, and to improve performance of executing an instruction block by, for example, allowing for early fetching of instructions and/or data, improved branch prediction, speculative execution, improved energy efficiency, and improved code compactness. In other examples, different numbers of instructions windows are possible, such as one, four, eight, or other number of instruction windows.

Each of the instruction windows 210 and 211 can receive instructions and data from one or more of input ports 220, 221, and 222 which connect to an interconnect bus and instruction cache 227, which in turn is connected to the instruction decoders 228 and 229. Additional control signals can also be received on an additional input port 225. Each of the instruction decoders 228 and 229 decodes instruction headers and/or instructions for an instruction block and stores the decoded instructions within a memory store 215 and 216 located in each respective instruction window 210 and 211. Further, each of the decoders 228 and 229 can send data to the control unit 205, for example, to configure data stored in the register instruction data store 207 read from an instruction header or generated from individual register access instructions.

The processor core 111 further includes a register file 230 coupled to an L1 (level one) cache 235. The register file 230 stores data for registers defined in the block-based processor architecture, and can have one or more read ports and one or more write ports. The register file 230 can be used to pass values between instruction blocks operating on different instruction windows or different processor cores. For example, a register file may include two or more write ports for storing data in the register file, as well as having a plurality of read ports for reading data from individual registers within the register file. In some examples, a single instruction window (e.g., instruction window 210) can access only one port of the register file at a time, while in other examples, the instruction window 210 can access one read port and one write port, or can access two or more read ports and/or write ports simultaneously. In some examples, the register file 230 can include 64 registers, each of the registers holding a word of 32 bits of data. (For convenient explanation, this application will refer to 32-bits of data as a word, unless otherwise specified. Suitable processors according to the disclosed technology could operate with 8-, 16-, 64-, 128-, 256-bit, or another number of bits words) In some examples, some of the registers within the register file 230 may be allocated to special purposes. For example, some of the registers can be dedicated as system registers examples of which include registers storing constant values (e.g., an all zero word), program counter(s) (PC), which indicate the current address of a program thread that is being executed, a physical core number, a logical core number, a core assignment topology, core control flags, execution flags, a processor topology, or other suitable dedicated purpose. In some examples, there are multiple program counter registers, one or each program counter, to allow for concurrent execution of multiple execution threads across one or more processor cores and/or processors. In some examples, program counters are implemented as designated memory locations instead of as registers in a register file. In some examples, use of the system registers may be restricted by the operating system or other supervisory computer instructions. In some examples, the register file 230 is implemented as an array of flip-flops, while in other examples, the register file can be implemented using latches, SRAM, or other forms of memory storage. The ISA specification for a given processor, for example processor 100, specifies how registers within the register file 230 are defined and used.

In some examples, the processor 100 includes a global register file that is shared by a plurality of the processor cores. In some examples, individual register files associate with a processor core can be combined to form a larger file, statically or dynamically, depending on the processor ISA and configuration.

As shown in FIG. 2, the memory store 215 of the instruction window 210 includes a number of decoded instructions 241, a left operand (LOP) buffer 242, a right operand (ROP) buffer 243, a predicate buffer 244, three broadcast channels 245, and an instruction scoreboard 247. In some examples of the disclosed technology, each instruction of the instruction block is decomposed into a row of decoded instructions, left and right operands, and scoreboard data, as shown in FIG. 2. The decoded instructions 241 can include partially- or fully-decoded versions of instructions stored as bit-level control signals. The operand buffers 242 and 243 store operands (e.g., register values received from the register file 230, data received from memory, immediate operands coded within an instruction, operands calculated by an earlier-issued instruction, or other operand values) until their respective decoded instructions are ready to execute. Instruction operands and predicates are read from the operand buffers 242 and 243 and predicate buffer 244, respectively, not the register file. The instruction scoreboard 245 can include a buffer for predicates directed to an instruction, including wire-OR logic for combining predicates sent to an instruction by multiple instructions.

The memory store 216 of the second instruction window 211 stores similar instruction information (decoded instructions, operands, and scoreboard) as the memory store 215, but is not shown in FIG. 2 for the sake of simplicity. Instruction blocks can be executed by the second instruction window 211 concurrently or sequentially with respect to the first instruction window, subject to ISA constraints and as directed by the control unit 205.

In some examples of the disclosed technology, front-end pipeline stages IF and DC can run decoupled from the back-end pipelines stages (IS, EX, LS). The control unit can fetch and decode two instructions per clock cycle into each of the instruction windows 210 and 211. The control unit 205 provides instruction window dataflow scheduling logic to monitor the ready state of each decoded instruction's inputs (e.g., each respective instruction's predicate(s) and operand(s) using the scoreboard 245. When all of the input operands and predicate(s) for a particular decoded instruction are ready, the instruction is ready to issue. The control unit 205 then initiates execution of (issues) one or more next instruction(s) (e.g., the lowest numbered ready instruction) each cycle, and control signals based on the decoded instruction and the instruction's input operands are sent to one or more of functional units 260 for execution. The decoded instruction can also encodes a number of ready events. The scheduler in the control unit 205 accepts these and/or events from other sources and updates the ready state of other instructions in the window. Thus execution proceeds, starting with the processor core's 111 ready zero input instructions, instructions that are targeted by the zero input instructions, and so forth.

The decoded instructions 241 need not execute in the same order in which they are arranged within the memory store 215 of the instruction window 210. Rather, the instruction scoreboard 247 is used to track dependencies of the decoded instructions and, when the dependencies have been met, the associated individual decoded instruction is scheduled for execution. For example, a reference to a respective instruction can be pushed onto a ready queue when the dependencies have been met for the respective instruction, and ready instructions can be scheduled in a first-in first-out (FIFO) order from the ready queue. For instructions encoded with load store identifiers (LSIDs), the execution order will also follow the priorities enumerated in the instruction LSIDs, or by executed in an order that appears as if the instructions were executed in the specified order.

Information stored in the scoreboard 245 can include, but is not limited to, the associated instruction's execution predicate(s) (such as whether the instruction is waiting for a predicate bit to be calculated and whether the instruction executes if the predicate bit is true or false), availability of operands to the instruction, or other prerequisites required before issuing and executing the associated individual instruction. The number of instructions that are stored in each instruction window generally corresponds to the number of instructions within an instruction block. In some examples, operands and/or predicates are received on one or more broadcast channels that allow sending the same operand or predicate to a larger number of instructions. In some examples, the number of instructions within an instruction block can be 32, 64, 128, 1,024, or another number of instructions. In some examples of the disclosed technology, an instruction block is allocated across multiple instruction windows within a processor core. Out-of-order operation and memory access can be controlled according to data specifying one or more modes of operation.

In some examples, restrictions are imposed on the processor (e.g., according to an architectural definition, or by a programmable configuration of the processor) to disable execution of instructions out of the sequential order in which the instructions are arranged in an instruction block. In some examples, the lowest-numbered instruction available is configured to be the next instruction to execute. In some examples, control logic traverses the instructions in the instruction block and executes the next instruction that is ready to execute. In some examples, only one instruction can issue and/or execute at a time. In some examples, the instructions within an instruction block issue and execute in a deterministic order (e.g., the sequential order in which the instructions are arranged in the block). In some examples, the restrictions on instruction ordering can be configured when using a software debugger to by a user debugging a program executing on a block-based processor.

Instructions can be allocated and scheduled using the control unit 205 located within the processor core 111. The control unit 205 orchestrates fetching of instructions from memory, decoding of the instructions, execution of instructions once they have been loaded into a respective instruction window, data flow into/out of the processor core 111, and control signals input and output by the processor core. For example, the control unit 205 can include the ready queue, as described above, for use in scheduling instructions. The instructions stored in the memory store 215 and 216 located in each respective instruction window 210 and 211 can be executed atomically. Thus, updates to the visible architectural state (such as the register file 230 and the memory) affected by the executed instructions can be buffered locally within the core 200 until the instructions are committed. The control unit 205 can determine when instructions are ready to be committed, sequence the commit logic, and issue a commit signal. For example, a commit phase for an instruction block can begin when all register writes are buffered, all writes to memory are buffered, and a branch target is calculated. The instruction block can be committed when updates to the visible architectural state are complete. For example, an instruction block can be committed when the register writes are written to as the register file, the stores are sent to a load/store unit or memory controller, and the commit signal is generated. The control unit 205 also controls, at least in part, allocation of functional units 260 to each of the respective instructions windows.

As shown in FIG. 2, a first router 250, which has a number of execution pipeline registers 255, is used to send data from either of the instruction windows 210 and 211 to one or more of the functional units 260, which can include but are not limited to, integer ALUs (arithmetic logic units) (e.g., integer ALUs 264 and 265), floating point units (e.g., floating point ALU 267), shift/rotate logic (e.g., barrel shifter 268), or other suitable execution units, which can including graphics functions, physics functions, and other mathematical operations. The first router 250 further includes wakeup/select logic 258, which is used to determine when memory instructions are sent to a load/store queue 275. For example, the wakeup/select logic 258 can determine if all source operands and predicate conditionals are available for a memory access instruction and based on the determination, send the address (and data, if applicable) to the load/store queue 275.

Data from the functional units 260 can then be routed through a second router 270 to outputs 290, 291, and 292, routed back to an operand buffer (e.g. LOP buffer 242 and/or ROP buffer 243), or fed back to another functional unit, depending on the requirements of the particular instruction being executed. The second router 270 include the load/store queue 275, which can be used to issue memory instructions, a data cache 277, which stores data being input to or output from the core to memory, and load/store pipeline register 278.

The load/store queue 275 receives and temporarily stores information for performing memory access instructions. The instruction block can execute all the memory access instructions as a single, atomic transactional block. In other words, either all or none of the memory access instructions are performed. The relative order in which memory access instructions is determined based on LSIDs associated with each memory access instruction (e.g., an LSID encoded with the corresponding instruction) and in some cases, the store mask. In some examples, additional performance can be obtained by executing the memory access instructions out of the LSID-specified relative ordering, but the state of memory must still appear as if the instructions were executed in order. The load/store queue 275 also receives addresses for load instructions, and addresses and data for store instructions. In some examples, the load/store queue waits to perform the queued memory access instructions until it is determined that the containing instruction block will actually commit In other examples, the load/store queue 275 can issue at least some memory access instructions speculatively, but will need to flush the memory operations in the event the block does not commit In other examples, the control unit 205 determines the order in which memory access instructions are executed, by providing functionalities described as being performed by the wakeup/select logic and/or load/store queue 275. In some examples, the processor 100 includes a debug mode that allows for step-by-step issuance of memory access instructions with the aid of a debugger. The load/store queue 275 can be implemented using control logic (e.g., with a finite state machine) and memory (e.g., registers or SRAM) to execute the memory transactions and store memory instruction operands, respectively.

The core also includes control outputs 295 which are used to indicate, for example, when execution of all of the instructions for one or more of the instruction windows 210 or 211 has completed. When execution of an instruction block is complete, the instruction block is designated as "committed" and signals from the control outputs 295 can in turn can be used by other cores within the block-based processor 100 and/or by the control unit 160 to initiate scheduling, fetching, and execution of other instruction blocks. Both the first router 250 and the second router 270 can send data back to the instruction (for example, as operands for other instructions within an instruction block). In some examples, the control outputs 295 include register write mask values and/or register write vector register values, which can be used by other cores to determine when the currently executing instruction block has written to one or more or all of its target registers, which registers the block is writing to, and/or a count of a number of register write instruction that have been executed.

The examples disclosed herein are based on an example instruction set architecture that has explicit register read instructions, which cause the executing processor to read register values from a register file and send the register values to one or more target operands. For example, the target operand can specify an input operand of another instruction in the instruction block, a broadcast channel, or another register in the register file. The example instruction set architecture does not include explicit register write instructions; registers in a register file are written to by specifying a register as a target operand of the instruction. Thus, any number of instructions are considered register write instructions when the result is targeted to a register file, including move, add, and other such instructions, including logical and arithmetic instructions. It should be readily understood to one of ordinary skill in the art that other instruction set architectures can be adapted to use certain aspects of the disclosed technology. As will be readily understood to one of ordinary skill in the relevant art, the components within an individual core 200 are not limited to those shown in FIG. 2, but can be varied according to the requirements of a particular application. For example, a core may have fewer or more instruction windows, a single instruction decoder might be shared by two or more instruction windows, and the number of and type of functional units used can be varied, depending on the particular targeted application for the block-based processor. Other considerations that apply in selecting and allocating resources with an instruction core include performance requirements, energy usage requirements, integrated circuit die, process technology, and/or cost.

It will be readily apparent to one of ordinary skill in the relevant art that trade-offs can be made in processor performance by the design and allocation of resources within the instruction window (e.g., instruction window 210) and control unit 205 of the processor cores 110. The area, clock period, capabilities, and limitations substantially determine the realized performance of the individual cores 110 and the throughput of the block-based processor 100.

The instruction scheduler 206 can have diverse functionality. In certain higher performance examples, the instruction scheduler is highly concurrent. For example, each cycle, the decoder(s) write instructions' decoded ready state and decoded instructions into one or more instruction windows, selects the next instruction to issue, and, in response the back end sends ready events—either target-ready events targeting a specific instruction's input slot (predicate, left operand, right operand, etc.), or broadcast-ready events targeting all instructions. The per-instruction ready state bits, together with the decoded ready state can be used to determine that the instruction is ready to issue.

In some cases, the scheduler 206 accepts events for target instructions that have not yet been decoded and must also inhibit reissue of issued ready instructions. In some examples, instructions can be non-predicated, or predicated (based on a true or false condition). A predicated instruction does not become ready until it is targeted by another instruction's predicate result, and that result matches the predicate condition. If the associated predicate condition does not match, the instruction never issues. In some examples, predicated instructions may be issued and executed speculatively. In some examples, a processor may subsequently check that speculatively issued and executed instructions were correctly speculated. In some examples a misspeculated issued instruction and the specific transitive closure of instructions in the block that consume its outputs may be re-executed, or misspeculated side effects annulled. In some examples, discovery of a misspeculated instruction leads to the complete roll back and re-execution of an entire block of instructions. In some examples, the scheduler performs some or all of the operations described as being performed by the wakeup/selection logic and/or load/store queue discussed above.

Upon branching to a new instruction block, the respective instruction window(s) ready state is cleared (a block reset). However when an instruction block branches back to itself (a block refresh), only active ready state is cleared. The decoded ready state for the instruction block can thus be preserved so that it is not necessary to re-fetch and decode the block's instructions. Hence, block refresh can be used to save time and energy in loops.

V. Example Stream of Instruction Blocks

Figure 3:
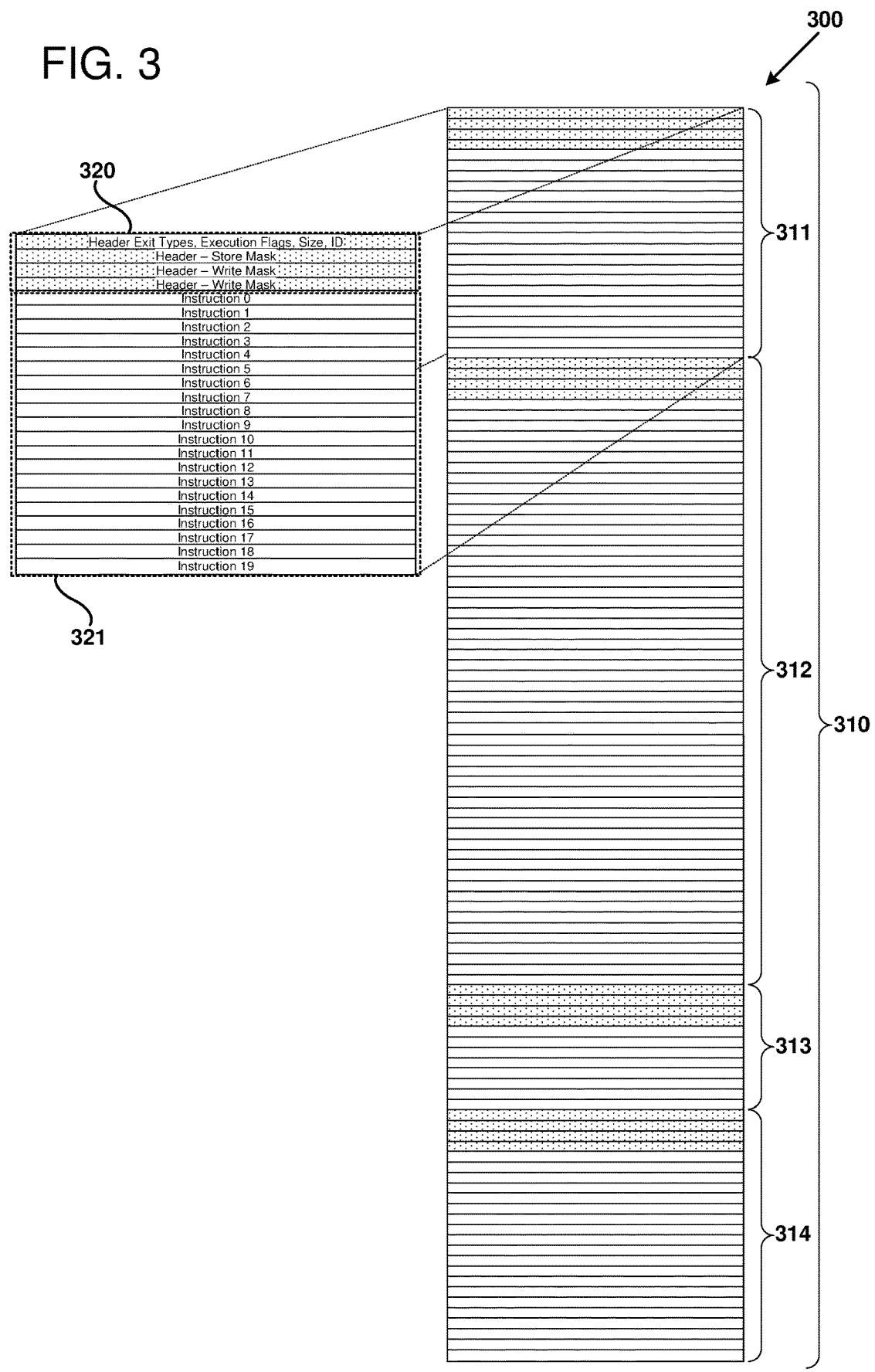
FIG. 3 illustrates a number of instruction blocks, according to certain examples of disclosed technology.

Turning now to the diagram 300 of FIG. 3, a portion 310 of a stream of block-based instructions, including a number of variable length instruction blocks 311-314 is illustrated.

The stream of instructions can be used to implement user application, system services, or any other suitable use. The stream of instructions can be stored in memory, received from another process in memory, received over a network connection, or stored or received in any other suitable manner In the example shown in FIG. 3, each instruction block begins with an instruction header, which is followed by a varying number of instructions. For example, the instruction block 311 includes a header 320 and twenty instructions 321. The particular instruction header 320 illustrated includes a number of data fields that control, in part, execution of the instructions within the instruction block, and also allow for improved performance enhancement techniques including, for example branch prediction, speculative execution, lazy evaluation, and/or other techniques. The instruction header 320 also includes an indication of the instruction block size. The instruction block size can be in larger chunks of instructions than one, for example, the number of 4-instruction chunks contained within the instruction block. In other words, the size of the block is shifted 4 bits in order to compress header space allocated to specifying instruction block size. Thus, a size value of 0 indicates a minimally-sized instruction block which is a block header followed by four instructions. In some examples, the instruction block size is expressed as a number of bytes, as a number of words, as a number of n-word chunks, as an address, as an address offset, or using other suitable expressions for describing the size of instruction blocks. In some examples, the instruction block size is indicated by a terminating bit pattern in the instruction block header and/or footer.

The instruction block header 320 can also include one or more execution flags that indicate one or more modes of operation for executing the instruction block. For example, the modes of operation can include core fusion operation, vector mode operation, memory dependence prediction, and/or in-order or deterministic instruction execution.

In some examples of the disclosed technology, the instruction header 320 includes one or more identification bits that indicate that the encoded data is an instruction header. For example, in some block-based processor ISAs, a single ID bit in the least significant bit space is always set to the binary value 1 to indicate the beginning of a valid instruction block. In other examples, different bit encodings can be used for the identification bit(s). In some examples, the instruction header 320 includes information indicating a particular version of the ISA for which the associated instruction block is encoded.

The block instruction header can also include a number of block exit types for use in, for example, branch prediction, control flow determination, and/or branch processing. The exit type can indicate what the type of branch instructions are, for example: sequential branch instructions, which point to the next contiguous instruction block in memory; offset instructions, which are branches to another instruction block at a memory address calculated relative to an offset; subroutine calls, or subroutine returns. By encoding the branch exit types in the instruction header, the branch predictor can begin operation, at least partially, before branch instructions within the same instruction block have been fetched and/or decoded.

The illustrated instruction block header 320 also includes a write mask that indicates which of registers in the register file may be written by register write instructions of the instruction block. For example, a write mask 01100110 would indicate that there are registers R1, R2, R5, and R6 may be written to during execution of the instruction block.

Not all of the indicated registers may be written to if there are predicated instructions that do not write to a particular register. In some examples, the write mask is stored in a register write vector register by, for example, an instruction decoder (e.g., decoder 228 or 229). In other examples, the instruction block header 320 does not include the write mask, but the write mask is generated dynamically by the instruction decoder by analyzing instruction dependencies when the instruction block is decoded. For example, the decoder can analyze register access instructions to determine a write mask and store the write mask data in a register write vector register. The write mask can be used to determine when execution of an instruction block has completed and thus to initiate commitment of the instruction block. The associated register file must receive a write to each entry before the instruction block can complete. In some examples a block-based processor architecture can include not only scalar instructions, but also single-instruction multiple-data (SIMD) instructions, that allow for operations with a larger number of data operands within a single instruction.

Examples of suitable block-based instructions that can be used for the instructions 321 can include instructions for executing integer and floating-point arithmetic, logical operations, type conversions, register reads and writes, memory loads and stores, execution of branches and jumps, and other suitable processor instructions. In some examples, the instructions include instructions for configuring the processor to operate according to one or more of operations by, for example, speculative execution based on control flow and data regarding memory access instructions stored in a hardware structure, such as a store instruction data store 207. In some examples, the store instruction data store 207 is not architecturally visible. In some examples, access to the store instruction data store 207 is configured to be limited to processor operation in a supervisory mode or other protected mode of the processor.

VI. Example Block Instruction Target Encoding

Figure 4:
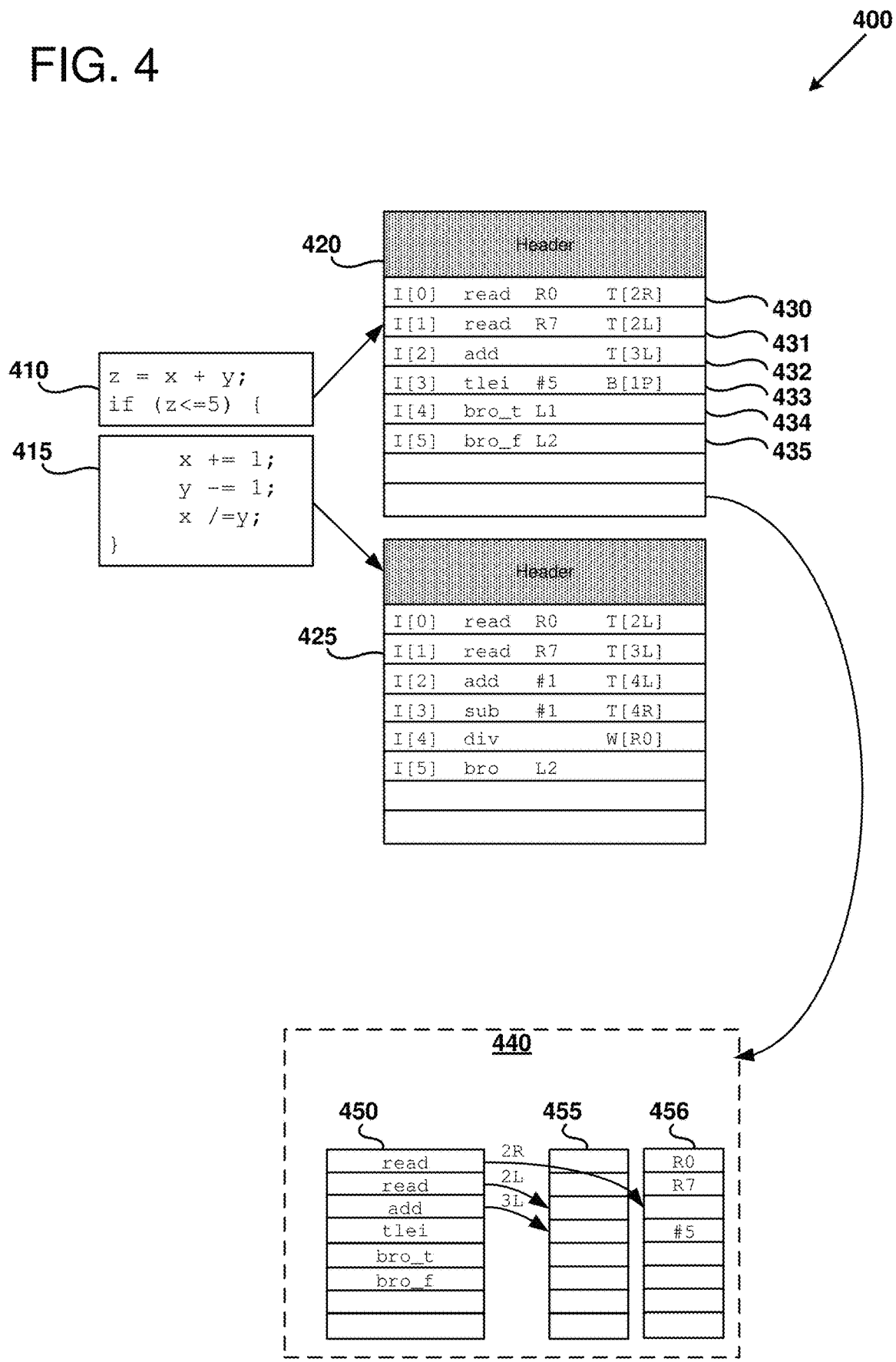
FIG. 4 illustrates portions of source code and instruction blocks, as can be used in some examples of the disclosed technology.

FIG. 4 is a diagram 400 depicting an example of two portions 410 and 415 of C language source code and their respective instruction blocks 420 and 425, illustrating how block-based instructions can explicitly encode their targets. In this example, the first two READ instructions 430 and 431 target the right (T[2R]) and left (T[2L]) operands, respectively, of the ADD instruction 432 (2R indicates targeting the right operand of instruction number 2; 2L indicates the left operand of instruction number 2). In the illustrated ISA, the read instruction is the only instruction that reads from the global register file (e.g., register file 230); however any instruction can target, the global register file. When the ADD instruction 432 receives the result of both register reads it will become ready and execute. It is noted that the present disclosure sometimes refers to the right operand as OP0 and the left operand as OP1.

When the TLEI (test-less-than-equal-immediate) instruction 433 receives its single input operand from the ADD, it will become ready to issue and execute. The test then produces a predicate operand that is broadcast on channel one (B[1P]) to all instructions listening on the broadcast channel for the predicate, which in this example are the two predicated branch instructions (BRO_T 434 and BRO_F 435). The branch instruction that receives a matching predicate will fire (execute), but the other instruction, encoded with the complementary predicated, will not fire/execute.

A dependence graph 440 for the instruction block 420 is also illustrated, as an array 450 of instruction nodes and their corresponding operand targets 455 and 456. This illustrates the correspondence between the block instructions 420, the corresponding instruction window entries, and the underlying dataflow graph represented by the instructions. Here decoded instructions READ 430 and READ 431 are ready to issue, as they have no input dependencies. As they issue and execute, the values read from registers R0 and R7 are written into the right and left operand buffers of ADD 432, marking the left and right operands of ADD 432 "ready." As a result, the ADD 432 instruction becomes ready, issues to an ALU, executes, and the sum is written to the left operand of the TLEI instruction 433.

VII. Example Block-Based Instruction Formats

FIG. 5 is a diagram illustrating generalized examples of instruction formats for an instruction header 510, a generic instruction 520, a branch instruction 530, and a memory access instruction 540 (e.g., a memory load or store instruction). The instruction formats can be used for instruction blocks executed according to a number of execution flags specified in an instruction header that specify a mode of operation. Each of the instruction headers or instructions is labeled according to the number of bits. For example the instruction header 510 includes four 32-bit words and is labeled from its least significant bit (lsb) (bit 0) up to its most significant bit (msb) (bit 127). As shown, the instruction header includes a store mask field, a register write mask field 515, a number of exit type fields, a number of execution flag fields, an instruction block size field, and an instruction header ID bit (the least significant bit of the instruction header). In some examples, the register mask field 515 is replaced or supplemented by register write count 517 (e.g., an integer), which indicates the number of register write instructions on each predicate path of the instruction block. For instruction blocks that have different numbers of write instructions on different predicate paths, one or more instructions can be nullified, and the executed count of write instructions incremented, such that each predicate path will indicate the same number of write instructions have executed at runtime. In some examples, the header 510 does not indicate either a register write count or a write mask, but the information is generated dynamically by the instruction decoder based on targets of individual register access instructions.

The execution flag fields depicted in FIG. 5 occupy bits 6 through 13 of the instruction block header 510 and indicate one or more modes of operation for executing the instruction block. For example, the modes of operation can include core fusion operation, vector mode operation, branch predictor inhibition, memory dependence predictor inhibition, block synchronization, break after block, break before block, block fall through, and/or in-order or deterministic instruction execution.

The exit type fields include data that can be used to indicate the types of control flow instructions encoded within the instruction block. For example, the exit type fields can indicate that the instruction block includes one or more of the following: sequential branch instructions, offset branch instructions, indirect branch instructions, call instructions, and/or return instructions. In some examples, the branch instructions can be any control flow instructions for transferring control flow between instruction blocks, including relative and/or absolute addresses, and using a conditional or unconditional predicate. The exit type fields can be used for branch prediction and speculative execution in addition to determining implicit control flow instructions.

The illustrated generic block instruction 520 is stored as one 32-bit word and includes an opcode field, a predicate field, a broadcast ID field (BID), a vector operation field (V), a single instruction multiple data (SIMD) field, a first target field (T1), and a second target field (T2). For instructions with more consumers than target fields, a compiler can build a fanout tree using move instructions, or it can assign high-fanout instructions to broadcasts. Broadcasts support sending an operand over a lightweight network to any number of consumer instructions in a core.

While the generic instruction format outlined by the generic instruction 520 can represent some or all instructions processed by a block-based processor, it will be readily understood by one of skill in the art that, even for a particular example of an ISA, one or more of the instruction fields may deviate from the generic format for particular instructions. The opcode field specifies the operation(s) performed by the instruction 520, such as memory read/write, register load/store, add, subtract, multiply, divide, shift, rotate, system operations, or other suitable instructions. The predicate field specifies the condition under which the instruction will execute. For example, the predicate field can specify the value "true," and the instruction will only execute if a corresponding condition flag matches the specified predicate value. In some examples, the predicate field specifies, at least in part, which is used to compare the predicate, while in other examples, the execution is predicated on a flag set by a previous instruction (e.g., the preceding instruction in the instruction block). In some examples, the predicate field can specify that the instruction will always, or never, be executed. Thus, use of the predicate field can allow for denser object code, improved energy efficiency, and improved processor performance, by reducing the number of branch instructions that are decoded and executed.

The target fields T1 and T2 specifying the instructions to which the results of the block-based instruction are sent. For example, an ADD instruction at instruction slot 5 can specify that its computed result will be sent to instructions at slots 3 and 10, including specification of the operand slot (e.g., left operation, right operand, or predicate operand). Depending on the particular instruction and ISA, one or both of the illustrated target fields can be replaced by other information, for example, the first target field T1 can be replaced by an immediate operand, an additional opcode, specify two targets, etc.

The branch instruction 530 includes an opcode field, a predicate field, a broadcast ID field (BID), and an offset field. The opcode and predicate fields are similar in format and function as described regarding the generic instruction. The offset can be expressed in units of groups of four instructions, thus extending the memory address range over which a branch can be executed. The predicate shown with the generic instruction 520 and the branch instruction 530 can be used to avoid additional branching within an instruction block. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. For example, a BRO_F (predicated false) instruction will issue if it is sent a false predicate value.

It should be readily understood that, as used herein, the term "branch instruction" is not limited to changing program execution to a relative memory location, but also includes jumps to an absolute or symbolic memory location, subroutine calls and returns, and other instructions that can modify the execution flow. In some examples, the execution flow is modified by changing the value of a system register (e.g., a program counter PC or instruction pointer), while in other examples, the execution flow can be changed by modifying a value stored at a designated location in memory. In some examples, a jump register branch instruction is used to jump to a memory location stored in a register. In some examples, subroutine calls and returns are implemented using jump and link and jump register instructions, respectively.

The memory access instruction 540 format includes an opcode field, a predicate field, a broadcast ID field (BID), a load store ID field (LSID), an immediate field (IMM) offset field, and a target field. The opcode, broadcast, predicate fields are similar in format and function as described regarding the generic instruction. For example, execution of a particular instruction can be predicated on the result of a previous instruction (e.g., a comparison of two operands). If the predicate is false, the instruction will not commit values calculated by the particular instruction. If the predicate value does not match the required predicate, the instruction does not issue. The immediate field (e.g., and shifted a number of bits) can be used as an offset for the operand sent to the load or store instruction. The operand plus (shifted) immediate offset is used as a memory address for the load/store instruction (e.g., an address to read data from, or store data to, in memory). The LSID field specifies a relative order for load and store instructions within a block. In other words, a higher-numbered LSID indicates that the instruction should execute after a lower-numbered LSID. In some examples, the processor can determine that two load/store instructions do not conflict (e.g., based on the read/write address for the instruction) and can execute the instructions in a different order, although the resulting state of the machine should not be different than as if the instructions had executed in the designated LSID ordering. In some examples, load/store instructions having mutually exclusive predicate values can use the same LSID value. For example, if a first load/store instruction is predicated on a value p being true, and second load/store instruction is predicated on a value p being false, then each instruction can have the same LSID value.

VIII. Example Processor State Diagram

Figure 6:
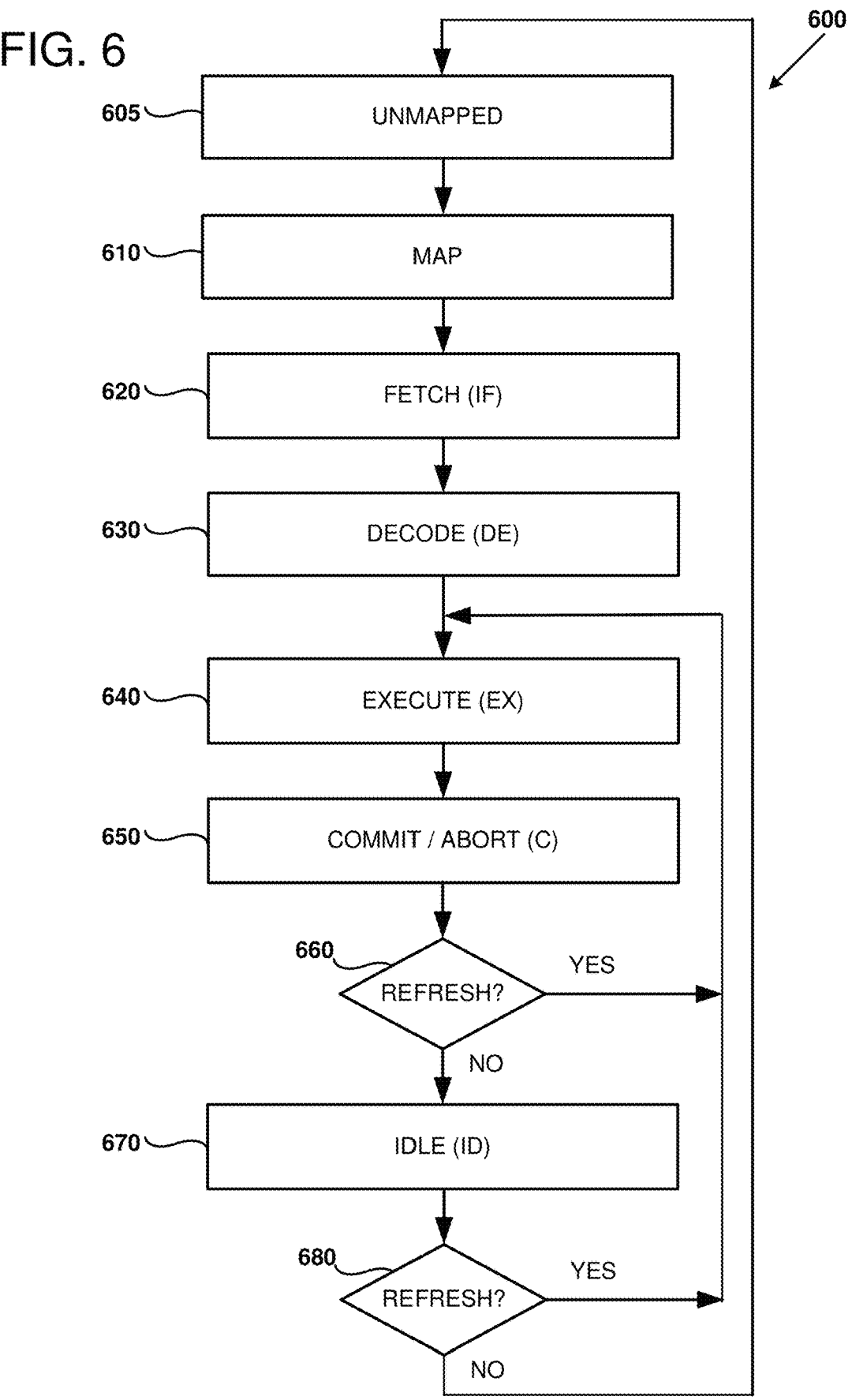
FIG. 6 is a state diagram illustrating a number of states assigned to an instruction block as it is mapped, executed, and retired.

FIG. 6 is a state diagram 600 illustrating number of states assigned to an instruction block as it is mapped, executed, and retired. For example, one or more of the states can be assigned during execution of an instruction according to one or more execution flags. It should be readily understood that the states shown in FIG. 6 are for one example of the disclosed technology, but that in other examples an instruction block may have additional or fewer states, as well as having different states than those depicted in the state diagram 600. At state 605, an instruction block is unmapped. The instruction block may be resident in memory coupled to a block-based processor, stored on a computer-readable storage device such as a hard drive or a flash drive, and can be local to the processor or located at a remote server and accessible using a computer network. The unmapped instructions may also be at least partially resident in a cache memory coupled to the block-based processor.

At instruction block map state 610, control logic for the block-based processor, such as an instruction scheduler, can be used to monitor processing core resources of the block-based processor and map the instruction block to one or more of the processing cores.

The control unit can map one or more of the instruction block to processor cores and/or instruction windows of particular processor cores. In some examples, the control unit monitors processor cores that have previously executed a particular instruction block and can re-use decoded instructions for the instruction block still resident on the "warmed up" processor core. Once the one or more instruction blocks have been mapped to processor cores, the instruction block can proceed to the fetch state 620.

When the instruction block is in the fetch state 620 (e.g., instruction fetch), the mapped processor core fetches computer-readable block instructions from the block-based processors' memory system and loads them into a memory associated with a particular processor core. For example, fetched instructions for the instruction block can be fetched and stored in an instruction cache within the processor core. The instructions can be communicated to the processor core using core interconnect. Once at least one instruction of the instruction block has been fetched, the instruction block can enter the instruction decode state 630.

During the instruction decode state 630, various bits of the fetched instruction are decoded into signals that can be used by the processor core to control execution of the particular instruction. For example, the decoded instructions can be stored in one of the memory stores 215 or 216 shown above, in FIG. 2. The decoding includes generating dependencies for the decoded instruction, operand information for the decoded instruction, and targets for the decoded instruction. Once at least one instruction of the instruction block has been decoded, the instruction block can proceed to execution state 640.

During the execution state 640, operations associated with the instruction are performed using, for example, functional units 260 as discussed above regarding FIG. 2. As discussed above, the functions performed can include arithmetical functions, logical functions, branch instructions, memory operations, and register operations. Control logic associated with the processor core monitors execution of the instruction block, and once it is determined that the instruction block can either be committed, or the instruction block is to be aborted, the instruction block state is set to commit/abort 650. In some examples, the control logic uses a write mask and/or a store mask for an instruction block to determine whether execution has proceeded sufficiently to commit the instruction block. Executed memory access instructions send data and address information to a load/store queue for accessing memory. In some examples, some memory access instructions (e.g., memory load instructions) can be performed before the block executes while other instructions (e.g., memory store instructions) wait to execute until the block is committing. In some examples, all memory access instructions wait to access memory until the block is committing. In some examples, memory load and store instructions access memory during execution of the instruction block, but additional hardware catches memory hazard conditions (e.g., read after write hazards) to ensure that the main memory appears as if the instructions were executed according to their relative ordering.

At the commit/abort state 650, the processor core control unit determines that operations performed by the instruction block can be completed. For example, memory load store operations, register read/writes, branch instructions, and other instructions will definitely be performed according to the control flow of the instruction block. Alternatively, if the instruction block is to be aborted, for example, because one or more of the dependencies of instructions are not satisfied, or the instruction was speculatively executed on a predicate for the instruction block that was not satisfied, the instruction block is aborted so that it will not affect the state of the sequence of instructions in memory or the register file. Any outstanding memory access operations are also completed. Regardless of whether the instruction block has committed or aborted, the instruction block goes to state 660 to determine whether the instruction block should be refreshed. If the instruction block is refreshed, the processor core re-executes the instruction block, typically using new data values, particularly the registers and memory updated by the just-committed execution of the block, and proceeds directly to the execute state 640. Thus, the time and energy spent in mapping, fetching, and decoding the instruction block can be avoided. Alternatively, if the instruction block is not to be refreshed, then the instruction block enters an idle state 670.

In the idle state 670, the processor core executing the instruction block can be idled by, for example, powering down hardware within the processor core, while maintaining at least a portion of the decoded instructions for the instruction block. At some point, the control unit determines 680 whether the idle instruction block on the processor core is to be refreshed or not. If the idle instruction block is to be refreshed, the instruction block can resume execution at execute state 640. Alternatively, if the instruction block is not to be refreshed, then the instruction block is unmapped and the processor core can be flushed and subsequently instruction blocks can be mapped to the flushed processor core.

While the state diagram 600 illustrates the states of an instruction block as executing on a single processor core for ease of explanation, it should be readily understood to one of ordinary skill in the relevant art that in certain examples, multiple processor cores can be used to execute multiple instances of a given instruction block, concurrently.

IX. Example Block-Based Processor and Memory Configuration

Figure 7:
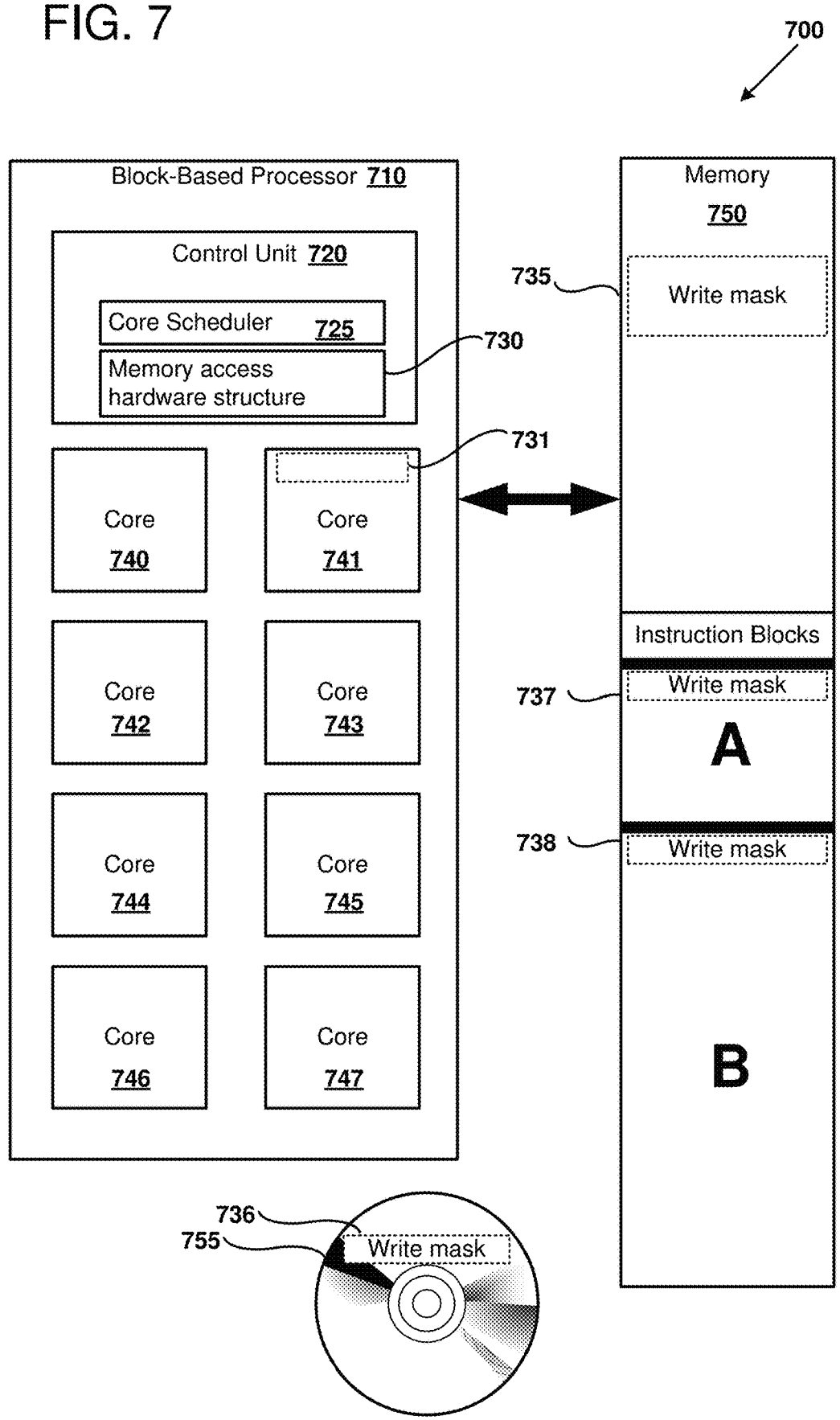
FIG. 7 illustrates a number of instructions blocks and processor cores, as can be used in some examples of the disclosed technology.

FIG. 7 is a diagram 700 illustrating an apparatus comprising a block-based processor 710, including a control unit 720 configured to execute instruction blocks according to data for one or more operation modes. The control unit 720 includes a core scheduler 725 and a memory access hardware structure 730. The core scheduler 725 schedules the flow of instructions including allocation and de-allocation of cores for performing instruction processing, control of input data and output data between any of the cores, register files, memory interfaces and/or I/O interfaces. The memory access hardware structure 730 stores data including, for example, register write mask data, register read mask data, register write vector register data indicating which registers have been written to by a register write instruction, and/or control flow data. The memory access hardware structure 730 can be implemented using any suitable technology, including SRAM, registers (e.g., including arrays of flip-flops or latches), or other suitable memory technology. The write mask can be generated when decoding instructions by the control unit 720. In some examples, the write mask is stored in a register 731 on a processor core, read from the memory 750 (write mask 735), from instruction block headers (e.g., write masks 737 and 738), or in a computer-readable storage medium, such as write mask data 736 stored in a storage media disc 755.

The block-based processor 710 also includes one or more processer cores 740-747 configured to fetch and execute instruction blocks. The illustrated block-based processor 710 has up to eight cores, but in other examples there could be 64, 512, 1024, or other numbers of block-based processor cores. The block-based processor 710 is coupled to a memory 750 which includes a number of instruction blocks, including instruction blocks A and B, and to the computer-readable storage media disc 755.

X. Example Method of Using Store Mask to Issue Instructions

Figure 8:
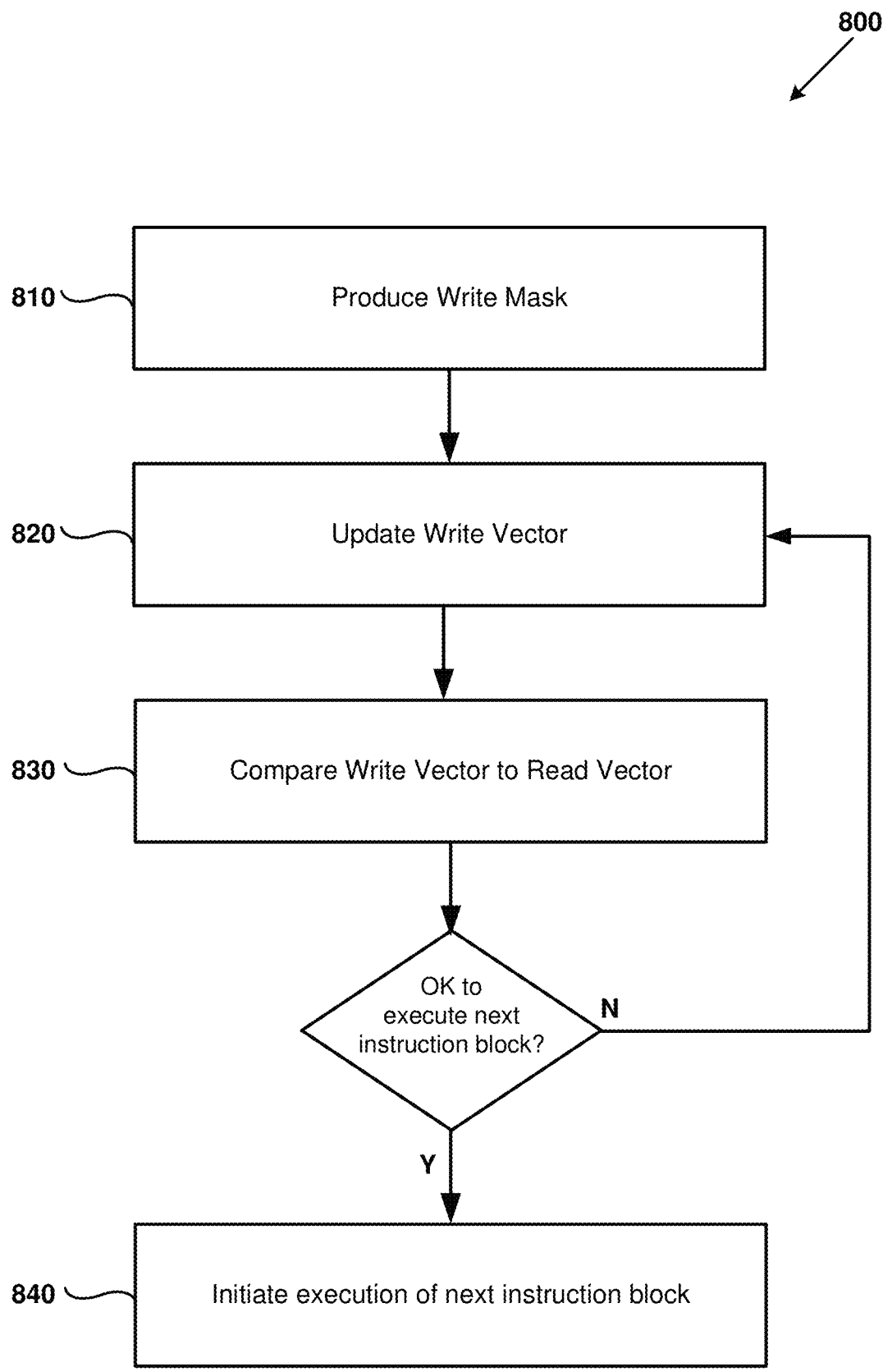
FIG. 8 is a flowchart outlining an example method of comparing register mask data to a register write vector, as can be performed in certain examples of the disclosed technology.

FIG. 8 is a flow chart 800 outlining an example method of using a write mask in order to determine when instructions can be issued and executed with a block-based processor, as can be performed in certain examples of the disclosed technology. For example, the block-based processor 100 of FIG. 1, including the block-based processor core 111 described above in FIG. 2, can be used to perform the outlined method. In some examples, an execution unit of a block-based processor is configured to execute register access instructions in an instruction block and a hardware structure stores data indicating execution ordering of at least some of the register access instructions, and a control unit of the block-based processor is configured to control issuing of the register access instructions to the execution unit based at least in a part on the hardware structure data.

At process block 810, a register write mask is produced for a block of instructions. For example, the register write mask can be produced for a first, previous block of instructions. The write mask includes data that indicates which registers may be written to by the first block of instructions. For example, a one value can be stored at a bit corresponding to registers that may be written by an instruction that targets a register (depending on conditionals associated with any predicated instructions), and a zero can be stored for registers that will not be written by the instruction block. As used herein, read and write instructions refer to register reads and writes, for example reads and writes to and from a register file. In some examples, the processor architecture includes read instructions, but any instruction with a target field can write to a register. The write mask can be stored in a register accessible by the control unit of a block-based processor core. In other examples, the write mask is stored in a small memory, or stored using other suitable techniques.

The write mask can be produced in any suitable fashion. In some examples, the write mask is produced by reading a write mask that is encoded in an instruction block header by a compiler that generates the instruction block. In some examples, the write mask is produced from a memory location that stores a previously generated write mask. For example, a binary file for a block-based processor program can include a section storing write masks for any number of instruction blocks in the program. In some examples, a previously generated write mask is cached from a previous execution of the instruction block, and does not need to be regenerated for subsequent instances of the instruction block. In some examples, the write mask is produced by generating a new write mask when decoding instructions of an instruction block. For example, as each instruction is decoded by the instruction decoder, any corresponding register identifier is extracted and an appropriate bit in a write mask can be set to indicate whether the identifier may be written by an instruction. Once a write mask has been produced, the method proceeds to process block 820. In some examples, the write mask is generated from a previous instance of executing its instruction block. In some examples, is generated by an instruction decoder that decodes the instructions that write to a register.

At process block 820, one or more instructions of the first instruction block are decoded, issued, and executed. If the instruction is a register access instruction, such as a register read or a register write, then a register write vector register can be updated. For example, a register write vector register can have a bit corresponding to each register in the global register file. When an instruction that writes to a register executes, then the corresponding bit in the register write vector is set. Thus, the register write vector register can indicate which register write instructions in an instruction block have executed. In other examples, other techniques can be used to update a register write vector, for example a counter can be used instead of a write vector register, as discussed in further detail below. Once the write vector register is updated, the method proceeds to process block 830.

At process block 830, the register write vector is compared to the write mask to determine which of the register write instructions in the previous block have executed. If all of the register write instructions in the first instruction block have executed, then a next consecutive instruction block in a stream of instruction blocks can proceed to execute. The write vector register updated at process block 820 is combined with a register mask produced at process block 810 to produce a value used in the comparison. For example, bitwise logic AND, OR, XOR, or other logic operations can be used to compare the register write vector to the write mask. Any subsequent instruction blocks (e.g., a second instruction block) can use the comparison result to determine whether the subsequent instruction block can initiate execution (e.g., on an entire block, or instruction-by-instruction basis). If the comparing indicates that it is acceptable to issue an instruction based on the write mask comparison, the method proceeds to process block 840. On the other hand, if the instruction block (or in some examples, individual instruction of the subsequent instruction block) in question is not acceptable to issue, then the method proceeds to process block 820 in order to execute additional instructions in the instruction block, and update the write vector register accordingly.

At process block 840, the write or read instruction associated with the subsequent instruction block issues into the execution phase of the processor pipeline. In some examples, a next register read instruction is selected to execute based at least in part on the write mask and a write vector register storing data indicating which of the register write instructions have executed. Thus, the instruction can proceed with execution as its register dependencies have been met, as indicated by the comparison. In some examples, other dependencies may cause the issued instruction to delay due to factors not related to the register data comparison.

In alternate implementations of the method of FIG. 8, instructions in the next instruction block can issue on an instruction-by-instruction basis instead of an instruction block basis. In other words, instructions in the next instruction block that are not dependent on a register write in the previous instruction block (that has not yet occurred) can issue prior to all register writes for the previous instruction block completing. For example, if the next instruction block includes READ instructions that read registers R5 and R6, then each READ instruction can issue as soon as the previous instruction block indicates that registers R5 or R6, respectively, have been written to (e.g., by setting a bit in the previous instruction block register write vector). In some examples, individual register READ instructions in the next instruction block can also issue if the previous block's write mask indicates that the block does not write to a dependent register.

In some examples of the method outlined in the flow chart 800, a block-based processor core includes an instruction unit configured to execute an instruction block encoded with a plurality of instructions where each of the instructions, including register access instructions, can issue based upon receiving dependencies specified for the respective instruction. The processor core further includes a control unit configured to control the issuing of register read and/or register write instructions in the instruction block to execution units based at least in part on data stored in a hardware structure indicating a relative ordering of register reads and writes over a plurality of different instruction blocks. In some examples, the hardware structure can be a write mask, a content addressable memory (CAM) or a lookup table. In some examples, data is stored in the hardware structure that was generated from a previous instant of executing the instruction block. In some examples, the data is stored in the hardware structure from data decoded from an instruction block header for the instruction block. In some examples, the processor core control unit is configured to prevent commitment of the instruction block until the write vector register indicates that all of the register access instructions have executed. In some examples, the processor control unit includes a counter that is updated (e.g., incremented) when a register access instruction is executed and the instruction block is indicated to be completed when the counter reaches a predetermined value for a number of register access instructions. In some examples, the processor core is configured to execute predicated instructions, including predicated register access instructions.

XI. Example Source and Object Code

FIG. 9 illustrates an example of source code 910 and corresponding assembly code 920 for a block-based processor, as can be used in certain examples of the disclosed technology. The source code 910 includes an if/else statement. Statements within each portion of the if/else statement include a number of register reads and register writes to the indicated variables (e.g., a, b, next, i, fib, n, and c). When the source code 910 is transformed to object code, a number of load and store assembly instructions will be generated.

The assembly code 920 for the source code portion 910 includes 15 instructions numbered 0 through 14. The assembly instructions indicate a number of fields for example an instruction op code pneumonic, a source data specified by the instruction (e.g., broadcast predicate B1P, a register, or an immediate value), and target designations. The assembly code includes register read instructions (0-2 and 9), register write instructions (instruction 4, 6, 7, 8, and 13), arithmetic instructions (e.g., instruction 5). The assembly code 920 also includes test instructions 3 and 10. Instruction 3 is a test if less than or equal instruction that will generate a predicate value on broadcast channel 1. It should also be noted that in some examples, speculative or out-of-order execution of instructions in two different instruction block can be performed, but the processor must still maintain semantics as if the memory dependencies specified by the write and read masks was not violated. The assembly code portion 920 can be converted to machine code for actual execution by a block-based processor.

XII. Example Control Flow Graph

Figure 10A:
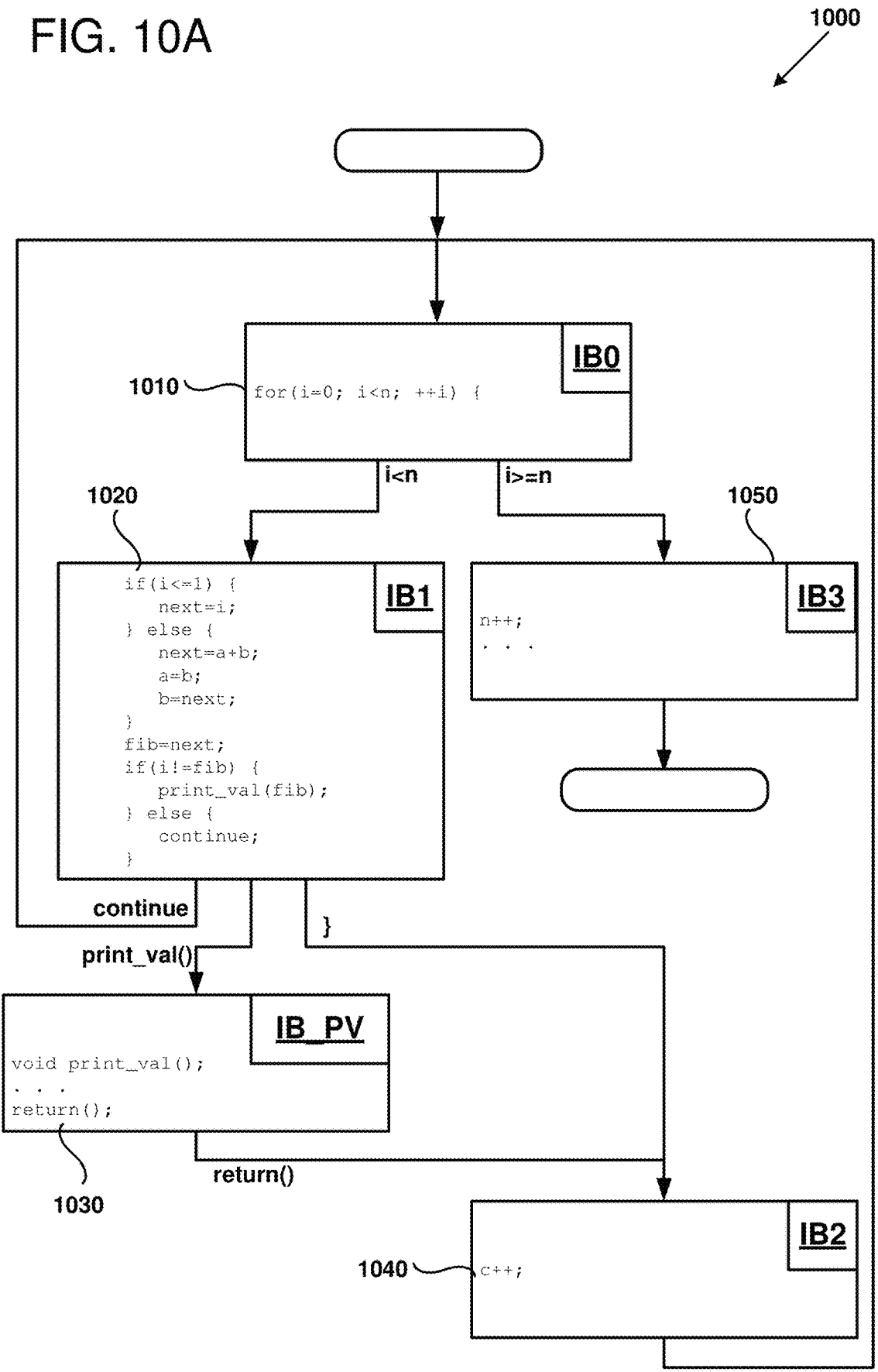
FIGS. 10A and 10B illustrate an example graph depicting register access instruction dependencies, as can be used in certain examples of the disclosed technology.
Figure 10B:
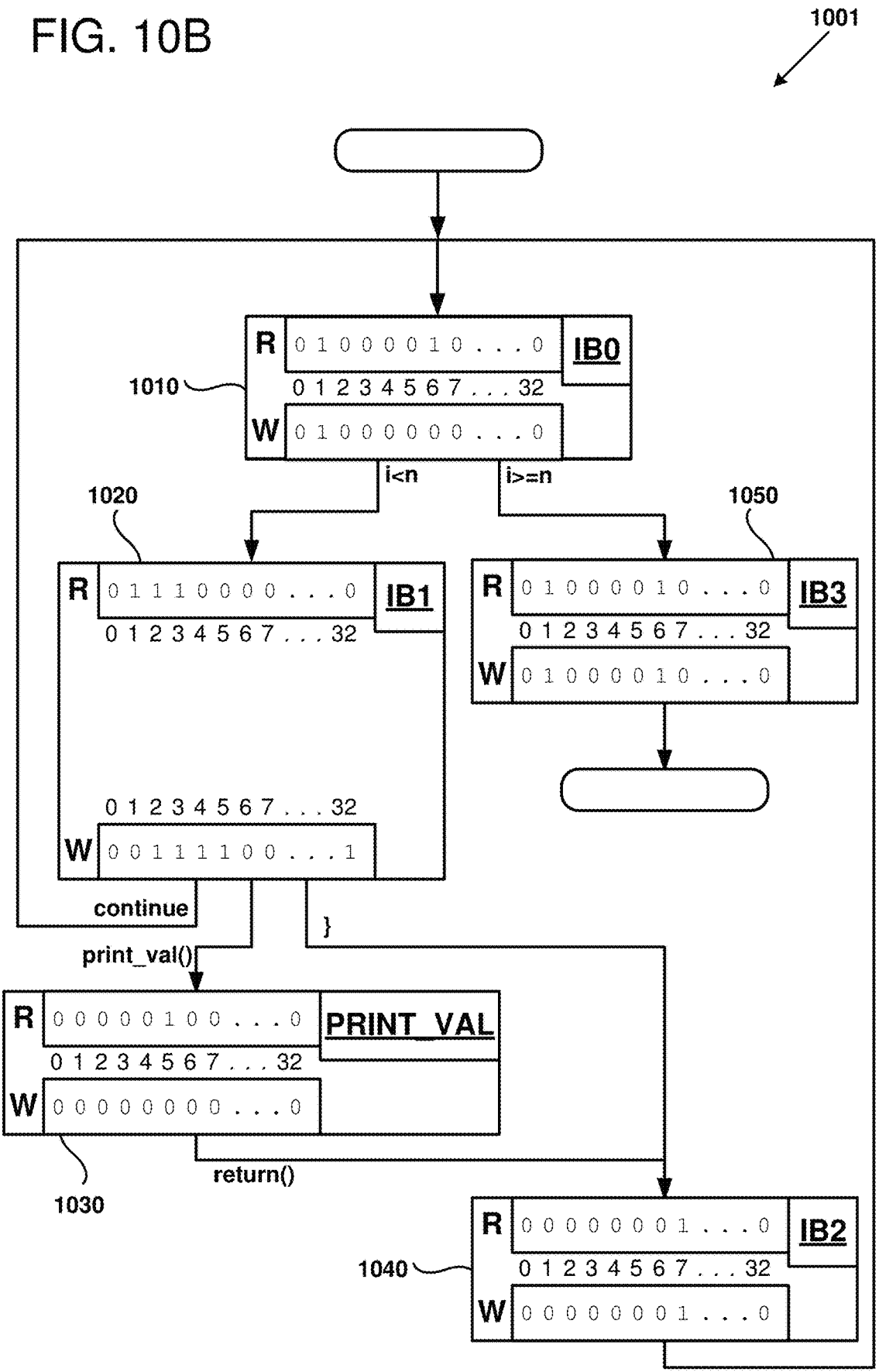

FIGS. 10A and 10B illustrates a graph 1000 generated for the assembly code 920 described above regarding FIG. 9. The graph 1000 is depicted in a graphical form for ease of illustration including nodes and edges, but can be represented in other forms, such as arrangements of data in memory according to an appropriate graph data structure, as will be readily apparent to one of ordinary skill in the relevant art. For ease of explanation, FIG. 10A illustrates portions of the source code 910 that have been assigned to a particular one of a plurality of instruction blocks IB0 (1010), IB1 (1020), IB_PV (1030), OB2 (1040), and IB3 (1050).

The edges indicate which exit points can be taken from a first instruction block to a next instruction block. For example, instruction block IB0 can exit to either instruction block IB1 or IB3, depending on conditional values generated by instructions within the block (for example, the for loop comparison i<n). Depending on which registers are read by the next instruction block, the next instruction block can initiate execution based on whether the register writes have completed for the previous instruction block.

FIG. 10B illustrates example read and write masks [or read instructions, on an individual basis] for each of the instruction blocks depicted in FIG. 10A. For example, instruction block IB1 has a read mask R that indicates the block will read from registers R1, R2, and R3. Instruction block IB0 has a write mask W that indicates it will write to register R1. Thus, instruction block IB1 will wait until the instruction window executing block IB0 indicates that register R1 has been written to (e.g., actually written to the register, or nullified a register write to the registers as if it had been written to) before initiating execution. In some examples, the next instruction block waits for all the registers in its read mask to be available before initiating execution of any instructions in the block. In other examples, individual instructions can execute one the write vector register for the preceding block indicates that any register the instruction is dependent on has been written. For example, instruction block PRINT_VAL may begin execution once register R5 has been written by instruction block IB1, while instruction block IB2 may begin execution once register R7 has been written by instruction block IB1.

In some examples, read mask, write mask, and/or write vector register data is stored in local registers or memory associated with each processor core. In other examples, a global table is used to store the data, for examples, a table stored in a memory, that can be accessed by a plurality of instruction blocks in flight.

XIII. Example Store Mask/Vector Comparison

Figure 11:
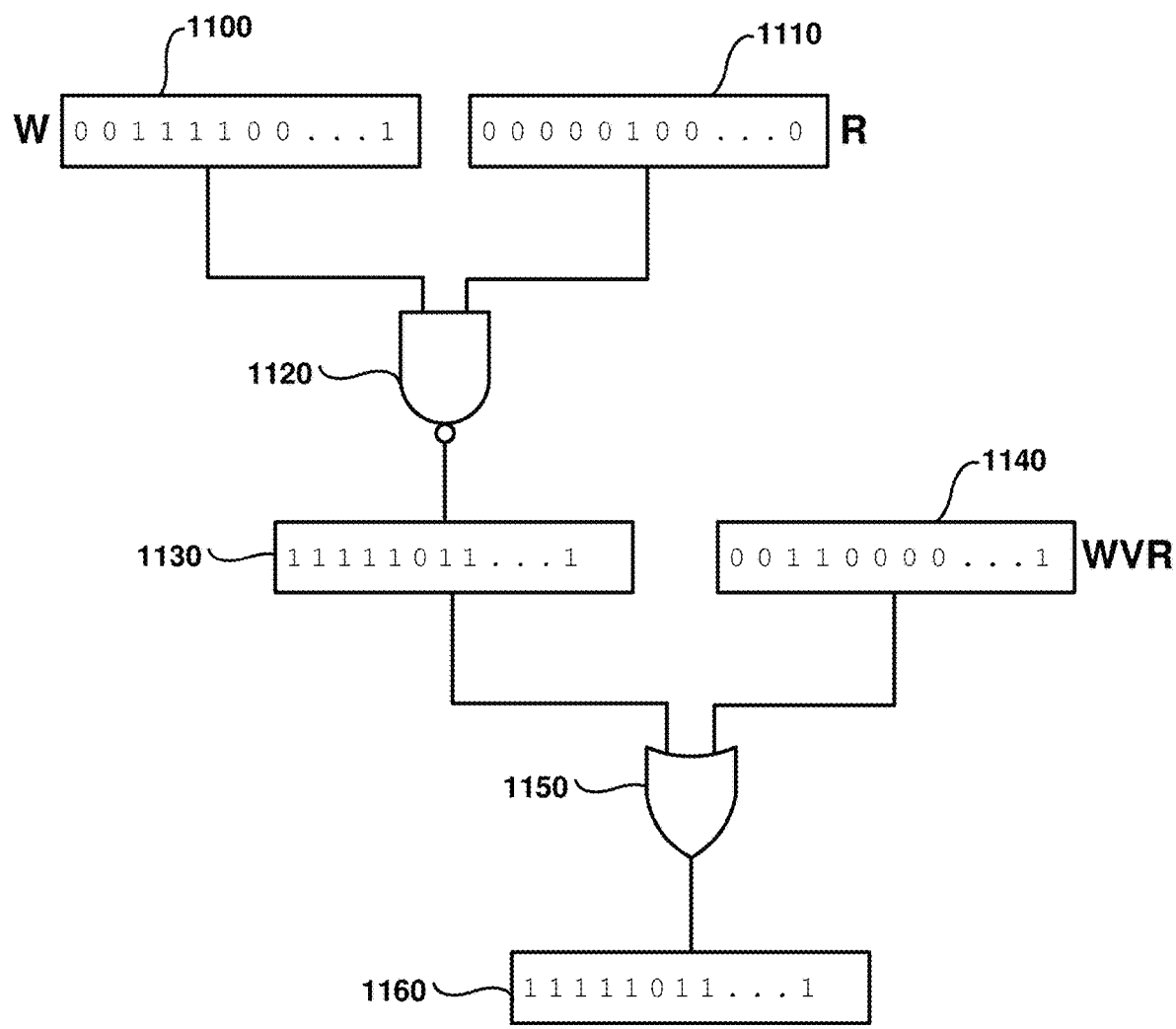
FIG. 11 illustrate an example of comparing read mask, write mask, and write vector register data, as can be used in certain examples of the disclosed technology.

FIG. 11 illustrates an example of comparing read masks, instruction identifiers, write masks, and write vector registers, as can be performed in certain examples of the disclosed technology. For example, as shown in FIG. 11, a write mask 1100 for instruction block IB1 stores 1 values for registers that will be written to by a preceding instruction block. Thus, the write mask 1100 indicates that registers R2-R5 and R32 will be written. The read mask 1110 for instruction block PRINT_VAL indicates that register R5 will be read by the instruction block. The write mask 1100 and the read mask 1110 are compared using a bitwise NAND gate 1120 as shown in order to produce a combined register mask 1130. The combined register mask 1130 indicates which registers the next instruction block (here, PRINT_VAL) is dependent on before initiating execution of the block. As shown, the instruction block can initiate execution once register R5, corresponding to the lone zero bit shown in the combined register mask 1130, is available. The combined register mask 1130 is compared to data from a write vector register 1140 with a bitwise OR gate 1150 to produce a masked write vector register 1160. The write vector register 1140 indicates which registers of the preceding instruction block have been written (as shown, registers R2, R3, and R32, which have corresponding one bits set). In some examples, one or more bits of the write vector register 1140 can be set to 1 by nullifying those register writes that will not actually execute due to predication of one or more instruction in the instruction block.

Once all the bits of the masked write vector register 1160 are set to one, then the instruction block can initiate execution. As shown, the block will wait, as the bit corresponding to register R5 is currently set to zero. In some examples, some instructions of an instruction block can initiate execution, but any instructions dependent on register R5 will wait (e.g., based on a control signal generated by the control unit for a core).

XIV. Example Method of Issuing Instructions According to Specified Ordering

Figure 12:
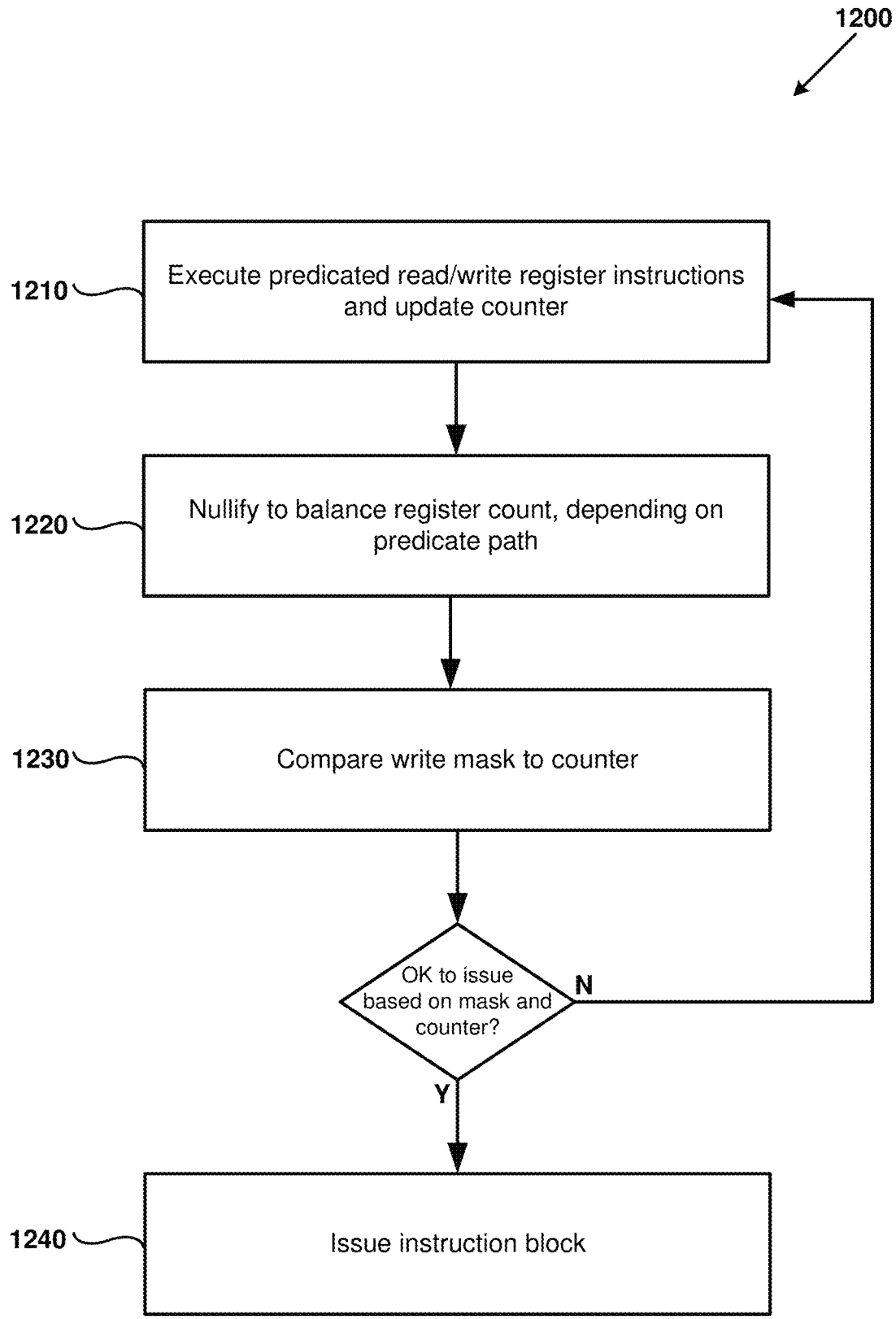
FIG. 12 is a flowchart outlining another example method of analyzing register access dependencies using a counter, as can be performed in certain examples of the disclosed technology.

FIG. 12 is a flowchart 1200 outlining an example method of issuing instructions based on a relative ordering specified in the instructions and the counter, as can be performed at certain examples of the disclosed technology. For example, the block-based processor 100 and processor core 111 discussed above regarding FIGS. 1 and 2 can be used to implement the illustrated method.

At process block 1210, a predicated register write instruction is executed. After executing the instruction, a counter is updated (e.g., incremented or decremented by one (1)). Thus, the counter can be used to indicate execution status of register access instructions instead of the write vector register discussed above. In some examples, a block-based processor control unit is configured to compare write vector register data with write and/or read mask data from the hardware structure to determine that all register write instructions ordered before a current one of the register access instructions have executed, and, based on the determination, issue the current register access instruction to the execution unit. In some examples, the control unit includes a counter that is incremented when one of the register write instructions is executed, and the control unit indicates the instruction block has completed when the counter reaches a predetermined value for a number of register write instructions encoded in the instruction block. Once the counter has been updated, the method proceeds to process block 1220.

At process block 1220, identifiers associated with register writes of predicate paths not taken are nullified. For example, if the predicate associated with instruction 10 of the assembly code 920 discussed below is taken, then instructions with register target operands associated with the not-taken portion can be nullified. For example, if instruction 10 evaluates to false, then instruction 13 (which writes to register R32) can by nullified by setting a bit in a write vector register, or by incrementing or decrementing a counter. After nullifying the identifiers depending on the predicate path taken, the method proceeds to process block 1030.

At process block 1230, register write count for an instruction block is compared to the counter. If the counter is set to a value that indicates that it is acceptable to issue a next instruction, the method proceeds to process block 1240. If the result of the comparison indicates that it is not acceptable to issue the instruction with register target operands, the method proceeds to process block 1210 in order to execute additional instructions. For example, if the counter indicates that five instructions have executed and the register write count is five, then it is acceptable for the next instruction block to initiate execution. Conversely, if the counter value is less than five, then it is not appropriate for the instruction block to initiate execution. In some examples, the register write count is stored in a counter and the counter is decremented until reaching zero. In other examples, the number of register writes is counted starting at zero and compared to the register write count.

XV. Example Method of Transforming Code

Figure 13:
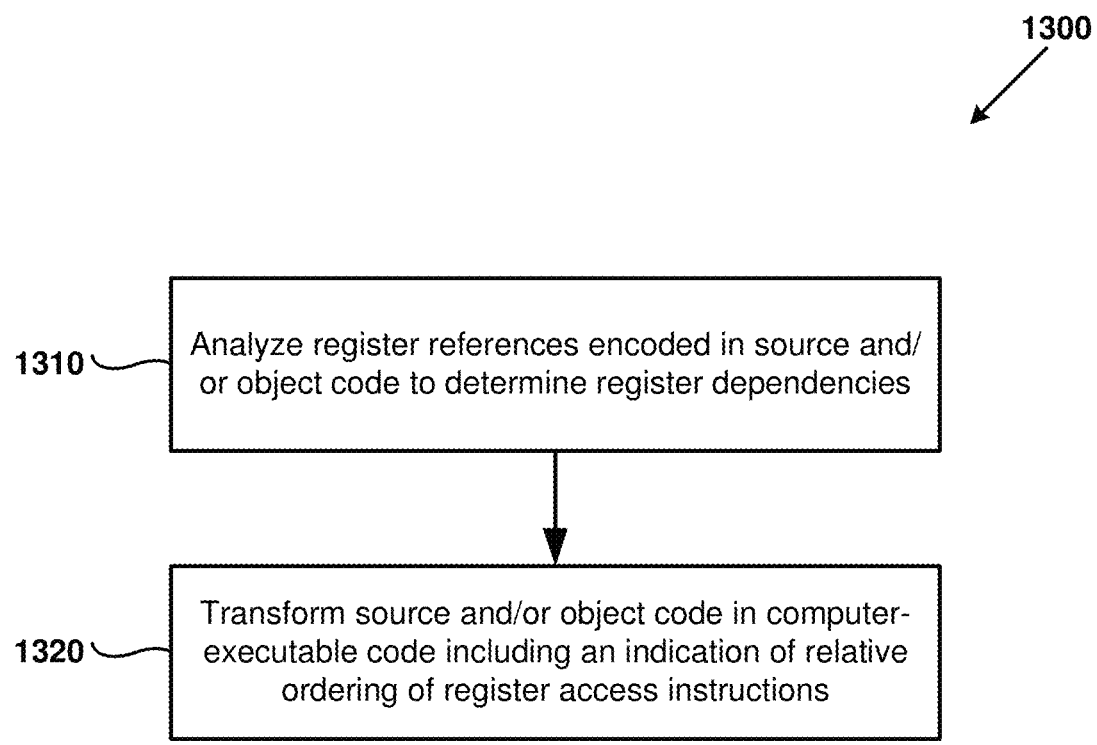
FIG. 13 is a flowchart outlining an example method of transforming source code and/or object code into block-based processor executable code including an indication of relative ordering of register access instructions, as can be performed in certain examples of the disclosed technology.

FIG. 13 is a flowchart 1300 outlining an example of transforming code into computer executable code for a block-based processor, as can be performed at certain examples of the disclosed technology. For example, a general purpose processor and/or a block-based processor can be used to implement the method outlined in FIGS. 8 and/or 12. In some examples, the code is transformed by a compiler and stored as object code that can be executed by a block-based processor (e.g., block-based processor 100). In some examples, a just-in-time compiler or an interpreter generates computer-executable code at runtime.

At process block 1310, variable and/or register identifiers encoded in source and/or object code are analyzed to determine register dependencies. For example, the register dependencies can include the relative ordering of register reads and writes between instruction blocks of a program. After analyzing the register accesses, the method proceeds to process block 1320.

At process block 1320, source code and/or object code are transformed into block-based computer executable code that includes an indication of a relative ordering of which registers may be written by executing instructions in the instruction block. For example, register identifiers can be encoded in the instruction. In some examples, a write mask is generated and stored as an instruction block header for the instruction block. In some examples, a special instruction is provided in order to load the write mask into memory of the control unit for use in masking a register write vector. Once the code has been transformed into block-based processor code, it can be stored in a computer readable storage medium, or transmitted via a computer network to another location for execution by a block-based processor.

XVI. Exemplary Computing Environment

Figure 14:
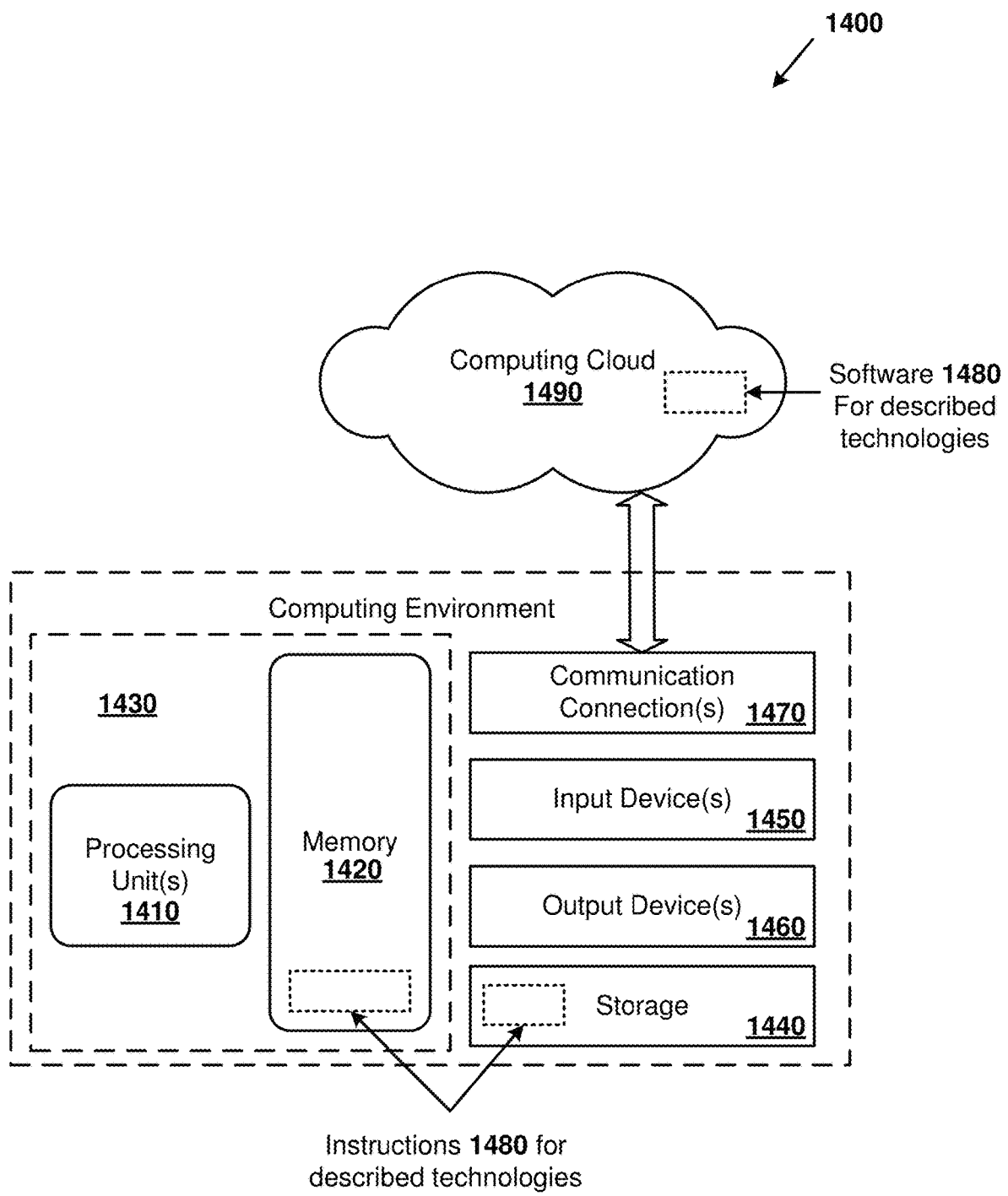
FIG. 14 is a block diagram illustrating a suitable computing environment for implementing some embodiments of the disclosed technology.

FIG. 14 illustrates a generalized example of a suitable computing environment 1400 in which described embodiments, techniques, and technologies, including configuring a block-based processor, can be implemented. For example, the computing environment 1400 can implement disclosed techniques for configuring a processor to generate and use register access instruction order encodings, or to compile code into computer-executable instructions for performing such operations, as described herein.

The computing environment 1400 is not intended to suggest any limitation as to scope of use or functionality of the technology, as the technology may be implemented in diverse general-purpose or special-purpose computing environments. For example, the disclosed technology may be implemented with other computer system configurations, including hand held devices, multi-processor systems, programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules (including executable instructions for block-based instruction blocks) may be located in both local and remote memory storage devices.

With reference to FIG. 14, the computing environment 1400 includes at least one block-based processing unit 1410 and memory 1420. In FIG. 14, this most basic configuration 1430 is included within a dashed line. The block-based processing unit 1410 executes computer-executable instructions and may be a real or a virtual processor. In a multi-processing system, multiple processing units execute computer-executable instructions to increase processing power and as such, multiple processors can be running simultaneously. The memory 1420 may be volatile memory (e.g., registers, cache, RAM), non-volatile memory (e.g., ROM, EEPROM, flash memory, etc.), or some combination of the two. The memory 1420 stores software 1480, images, and video that can, for example, implement the technologies described herein. The memory 1420 can be access by a block-based processor using the memory access instructions, including load and store instructions having LSIDs, discussed herein. A computing environment may have additional features. For example, the computing environment 1400 includes storage 1440, one or more input device(s) 1450, one or more output device(s) 1460, and one or more communication connection(s) 1470. An interconnection mechanism (not shown) such as a bus, a controller, or a network, interconnects the components of the computing environment 1400. Typically, operating system software (not shown) provides an operating environment for other software executing in the computing environment 1400, and coordinates activities of the components of the computing environment 1400.

The storage 1440 may be removable or non-removable, and includes magnetic disks, magnetic tapes or cassettes, CD-ROMs, CD-RWs, DVDs, or any other medium which can be used to store information and that can be accessed within the computing environment 1400. The storage 1440 stores instructions for the software 1480, plugin data, and messages, which can be used to implement technologies described herein.

The input device(s) 1450 may be a touch input device, such as a keyboard, keypad, mouse, touch screen display, pen, or trackball, a voice input device, a scanning device, or another device, that provides input to the computing environment 1400. For audio, the input device(s) 1450 may be a sound card or similar device that accepts audio input in analog or digital form, or a CD-ROM reader that provides audio samples to the computing environment 1400. The output device(s) 1460 may be a display, printer, speaker, CD-writer, or another device that provides output from the computing environment 1400.

The communication connection(s) 1470 enable communication over a communication medium (e.g., a connecting network) to another computing entity. The communication medium conveys information such as computer-executable instructions, compressed graphics information, video, or other data in a modulated data signal. The communication connection(s) 1470 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed methods.

In a virtual host environment, the communication(s) connections can be a virtualized network connection provided by the virtual host.

Some embodiments of the disclosed methods can be performed using computer-executable instructions implementing all or a portion of the disclosed technology in a computing cloud 1490. For example, disclosed compilers and/or block-based-processor servers are located in the computing environment, or the disclosed compilers can be executed on servers located in the computing cloud 1490. In some examples, the disclosed compilers execute on traditional central processing units (e.g., RISC or CISC processors).

Computer-readable media are any available media that can be accessed within a computing environment 1400. By way of example, and not limitation, with the computing environment 1400, computer-readable media include memory 1420 and/or storage 1440. As should be readily understood, the term computer-readable storage media includes the media for data storage such as memory 1420 and storage 1440, and not transmission media such as modulated data signals.

XVII. Additional Examples of the Disclosed Technology

Additional examples of the disclosed subject matter are discussed herein in accordance with the examples discussed above.

In some examples of the disclosed technology, an apparatus includes a processor having one or more block-based processor cores, each of the cores being configurable to execute one or more instruction blocks. The block-based processor cores can execute instruction blocks as transaction, atomic blocks of instructions. Some or all of the cores includes an execution unit configured to execute register read and write instructions contained in an instruction block to read from and/or write to, respectively, a register file comprising a plurality of registers, a hardware structure storing data indicative of an execution ordering of register read and write instructions, and a control unit configured to control issuing of register read and write instructions to the execution unit based at least in a part on the hardware structure data. In some examples, the register read or register write instructions are not register-specific instructions, but the registers to read to or write from are specified as source or target operands for the instruction. In some examples, the write instructions comprise explicit register write instructions. In some examples, the write instructions include any instruction that writes to a register file.

In some examples, the hardware structure includes a register write mask, a register read mask, a register write vector register, a content addressable memory (CAM), and/or a lookup table. In some examples, the data stored in the hardware structure indicates which of the registers will be written to by the core executing at least one of the instructions of the instruction block. In some examples, the data stored in the hardware structure indicates which of the registers have been written by the core during an instance of executing at least one of the instructions of the instruction block. In some examples, the data stored in the hardware structure is generated by an instruction decoder that decodes the register read and write instructions. In some examples, the data stored in the hardware structure is generated by reading write mask data from an instruction header encoded in the instruction block.

In some examples, a processor or processor core control unit is further configured to compare the write vector register data with write mask data from the hardware structure to determine which of the register write instructions have executed. In some examples, the processor or processor core control unit raises an exception if an instance of an instruction block writes to a register more than once. In some examples, a compiler that generates object code for an instruction block enforces an architectural requirement by preventing instruction blocks from issuing more than one write to the same register for an instance of an instruction block. In some examples, the control unit is further configured to compare the write vector register data with write mask data from the hardware structure to determine that all register write instructions for an instruction block ordered to execute before the current instruction block have executed, and, based on the determination, issue one or more instructions of the instruction block to the execution unit. In some examples, the control unit comprises a counter that is incremented (or, alternatively, decremented) when a register write instruction for a previous instruction block is executed, and wherein the control unit indicates the instruction block is ready to execute when the counter reaches a predetermined value for a number of register writes executed in the previous instruction block.

In some examples of the disclosed technology, a method of operating a processor to execute a current block of instructions comprising a plurality of register access instructions includes selecting a register access instruction of the plurality of instructions to execute based at least in part on dependencies encoded within a previous block of instructions and based at least in part on stored data indicating which of the write instructions have executed for the previous block, and executing the selected instruction.

In some examples, the stored data is stored in a write vector register, and the selecting includes comparing data from a register write mask encoded in a header of the previous block of instructions to the write vector register data. In some examples, the stored data is stored in a write vector register, and the selecting comprises evaluating conditions for one or more predicates in the previous block of instructions and, based on the evaluating, nullifying one or more entries in the write vector registers. In some examples, the stored data is stored in a write vector register, and the method further includes comparing the write vector register data to a read mask for the block of instructions, a write mask indicating which instructions of the previous block of instructions have executed, and based on the comparing, stalling execution of a next instruction block by processor. In some examples, the register file raises a signal or stalls execution of instruction blocks depending on values of write masks and register write vectors indicating a register hazard. In some examples, an instruction block that begins execution before determining a hazard (e.g., due to a previous instruction block writing to a register after it has been read by a next instruction block in an instruction block sequence) can cause the instruction block to flush and re-initiate execution. In some examples, register dependencies can by analyzed for more than one subsequent instruction blocks to determine possible hazards and stall or flush execution as appropriate.

In some examples, the method further includes based on the comparing, performing one of the following operations: stalling execution of one or more register read instructions in the current instruction block, stalling execution of the current instruction block, initiating execution of a next instruction block, or initiating an exception handler to indicate a register access fault, flushing an instruction block, or waiting for a previous block to begin decoding.

In some examples of the method, the stored data is stored in a write vector register, and the method further includes executing a register write instruction of the previous block of instructions, the register write instruction being encoded with an identifier of the register being written to, and based on the stored data in the write vector register, executing a register read instruction in the current instruction block.

In some examples of the disclosed technology, a method of compiling code for a block-based processor includes analyzing register accesses encoded in source code and/or object code to determine register dependencies for the instruction block, and instructions for transforming the source code and/or object code into computer-executable code for the instruction block, the computer-executable code including an indication of which registers may be written to by executing the instruction block. In some examples, the method further includes storing a write mask in a header of the instruction block, the write mask including the indication of which registers may be written to. In some examples, the method further includes storing an indication of the number of register write instructions contained in the instruction block. In some examples, optimizations can be made to computer-executable instruction emitted by the compiling method. For example, register read instructions can be made unpredicated or predicated, null instructions can be inserted into an instruction block for untaken predicate paths to avoid generating unpredicated read instructions. In some examples, register write instructions can be nullified.

In some examples of the disclosed technology, computer readable storage media store computer-readable instructions that when executed by a block-based processor, cause the processor to perform any of the disclosed methods.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. An apparatus comprising a processor comprising one or more processor cores, each of the cores being configurable to execute one or more instructions, each of the cores comprising:
    an execution unit configured to execute register read and write instructions to read from and/or write to, respectively, a register file comprising a plurality of registers;
    a hardware structure storing data including:
        a register write mask storing data that indicates which registers of the register file a current group of instructions will write to, and
        a register read mask storing data that indicates which registers of the register file a next group of instructions will read; and
    a control unit configured to control issuing of individual register read and write instructions of the next group of instructions to the execution unit by comparing the register write mask data to the register read mask data and allowing execution of a respective one of the individual register read and write instructions when the register write mask indicates any register the respective individual instruction is dependent on has been written by the current group of instructions.

2. The apparatus of claim 1, wherein the hardware structure further comprises at least one of the following: a register write mask, a register write vector register, a content addressable memory (CAM), or a lookup table.

3. The apparatus of claim 1, wherein the data stored in the hardware structure indicates which of the registers will be written to by the core executing at least one of the instructions of the instruction block.

4. The apparatus of claim 1, wherein the data stored in the hardware structure indicates which of the registers have been written by the core during an instance of executing at least one of the instructions of the instruction block.

5. The apparatus of claim 1, wherein the data stored in the hardware structure is generated by an instruction decoder that decodes the register read and write instructions.

6. The apparatus of claim 1, wherein the data stored in the hardware structure is generated by reading write mask data from an instruction header encoded in the instruction block.

7. The apparatus of claim 1, wherein the write instructions comprise explicit register write instructions.

8. The apparatus of claim 7, wherein the control unit is further configured to compare write vector register data with write mask data from the hardware structure to determine which of the register write instructions have executed.

9. The apparatus of claim 1, wherein the control unit is further configured to compare write vector register data with write mask data from the hardware structure to determine that all register write instructions for an instruction block ordered to execute before a next instruction block will execute, and, based on the determination, issue one or more instructions of the instruction block to the execution unit.

10. The apparatus of claim 1, wherein the control unit is configured to, based on the comparing, control issuing of individual register read and write instructions.

11. An apparatus comprising a processor comprising one or more processor cores, each of the cores being configurable to execute one or more groups of instructions, each of the cores comprising:
    an execution unit configured to execute register read and write instructions contained in a group of instructions to read from and/or write to, respectively, a register file comprising a plurality of registers;
    a hardware structure storing data indicative of a relative execution ordering of register read and write instructions within the group of instructions; and
    a control unit configured to control issuing of register read and write instructions to the execution unit based at least in a part on the hardware structure data, the control unit comprising a counter that is incremented when a register write instruction for a previous group of instructions is executed, and wherein the control unit indicates the group of instructions is ready to execute when the counter reaches a predetermined value for a number of register writes executed in the previous group of instructions.

12. The apparatus of claim 11, wherein the data stored in the hardware structure is generated by an instruction decoder that decodes the register read and write instructions.

13. The apparatus of claim 11, wherein the control unit is further configured to compare write vector register data with write mask data from the hardware structure to determine that all register write instructions for an instruction block ordered to execute before a next instruction block will execute, and, based on the determination, issue one or more instructions of the instruction block to the execution unit.

14. A method of operating a processor to execute a current block of instructions comprising a plurality of register access instructions, the method comprising:
- selecting a register access instruction of the plurality of register access instructions to execute by comparing register write data for a previous block of instructions to a counter that indicates execution status of register access instructions for the current block of instructions; and
- executing the selected register access instruction.

15. The method of claim 14, wherein the stored data is stored in a write vector register, and wherein the selecting comprises comparing data from a register write mask encoded in a header of the previous block of instructions to the write vector register data.

16. The method of claim 14, wherein:
- the stored data is stored in a write vector register; and
- the selecting comprises evaluating conditions for one or more predicates in the previous block of instructions and, based on the evaluating, nullifying one or more entries in the write vector registers.

17. The method of claim 14, wherein the stored data is stored in a write vector register, the method further comprising:
- comparing the write vector register data to a read mask for the block of instructions, a write mask indicating which instructions of the previous block of instructions have executed; and
- based on the comparing, stalling execution of a next instruction block by processor.

18. The method of claim 17, further comprising:
- based on the comparing, performing one of the following operations: stalling execution of one or more register read instructions in the current instruction block, stalling execution of the current instruction block, initiating execution of a next instruction block, or initiating an exception handler to indicate a register access fault, flushing an instruction block, or waiting for a previous instruction block to begin decoding.

19. The method of claim 14, wherein the stored data is stored in a write vector register, the method further comprising:
- executing a register write instruction of the previous block of instructions, the register write instruction being encoded with an identifier of the register being written to; and
- based on the stored data in the write vector register, executing a register read instruction in the current instruction block.

20. One or more computer readable storage media storing computer-readable instructions that when executed by a block-based processor, cause the processor to perform the method of claim 14.

* * * * *